US008744298B2

(12) United States Patent  
Sugimoto

(10) Patent No.: US 8,744,298 B2
(45) Date of Patent: Jun. 3, 2014

(54) IMAGE OUTPUT DEVICE WHICH, WHEN AUTHENTICATION MEDIA ARE READ BY AUTHENTICATION DEVICE, EXECUTES JOBS STORED IN STORAGE MEDIUM ON THE BASIS OF RESULT OF AUTHENTICATION

(75) Inventor: Hiroaki Sugimoto, Nagoya (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1114 days.

(21) Appl. No.: 12/720,722

(22) Filed: Mar. 10, 2010

(65) Prior Publication Data  
US 2010/0238495 A1 Sep. 23, 2010

(30) Foreign Application Priority Data  
Mar. 23, 2009 (JP) .................................. 2009-069899

(51) Int. Cl.  
G06F 15/00 (2006.01)

(52) U.S. Cl.  
USPC .......... 399/80; 358/1.14; 358/1.15; 358/1.16; 713/182

(58) Field of Classification Search  
CPC ..................... G06F 21/31; G03G 2215/00092; G03G 2215/00101  
USPC ........... 358/1.14, 1.15, 1.16; 399/80; 713/182  
See application file for complete search history.

(56) References Cited

U.S. PATENT DOCUMENTS

| 2004/0114184 A1* | 6/2004 | Sugiyama ..................... 358/1.18 |
| 2005/0259288 A1* | 11/2005 | Minato ........................ 358/1.13 |
| 2006/0209330 A1 | 9/2006 | Mitsui |

FOREIGN PATENT DOCUMENTS

| JP | 2005-025638 | 1/2005 |
| JP | 2005-031749 | 2/2005 |
| JP | 2005-169838 A | 6/2005 |
| JP | 2005-346458 | 12/2005 |
| JP | 2006-076034 A | 3/2006 |
| JP | 2006-191335 | 7/2006 |
| JP | 2006-260473 | 9/2006 |

OTHER PUBLICATIONS

Office Action (Notice of Grounds of Rejection) dated Nov. 30, 2010, issued in the corresponding Japanese Patent Application No. 2009-069899, and an English Translation thereof.

* cited by examiner

Primary Examiner — Peter K Huntsinger  
(74) Attorney, Agent, or Firm — Buchanan Ingersoll & Rooney P.C.

(57) ABSTRACT

When a plurality of authentication cards are read by an authentication device and the authentication cards are authenticated in an image output device, a binding and printing process is carried out. The image output device combines (binds) jobs associated with the authenticated cards into one job. The order of combining the jobs and the print mode for the combined job are set in accordance with the order in which the authentication cards have been authenticated or the priorities assigned to the respective jobs. The image output device prints the combined job to obtain a set of printouts. It is thus possible to provide the image output device which can output a plurality of jobs collectively, without the need of complicated operations, while maintaining a high level of security.

18 Claims, 29 Drawing Sheets

| | JOB 101 | JOB 102 | JOB 103 | JOB 104 |
|---|---|---|---|---|
| NUMBER OF PAGES | 3 | 5 | 3 | 5 |
| COLOR MODE | FULL COLOR | BLACK AND WHITE | FULL COLOR | BLACK AND WHITE |
| NUMBER OF COPIES | 2 | 3 | 4 | 3 |
| DOUBLE-SIDED OR SINGLE-SIDED PRINTING | DOUBLE-SIDED | SINGLE-SIDED | DOUBLE-SIDED | SINGLE-SIDED |
| STAPLING | YES | NO | YES | NO |
| USER ID | A | B | C | D |
| BINDING | YES | YES | YES | YES |
| BOX NUMBER | 1 | 2 | 3 | 4 |

(B)

| AUTHENTICATION DATA (USERS TO BE AUTHENTICATED) | A,B,C,D,······ |
|---|---|

FIG.18

|  | USER INFORMATION (CORPORATE JOB TITLE) |
|---|---|
| PRINT PRIORITY LEVEL 1 (HIGH) | DIRECTOR GENERAL |
| PRINT PRIORITY LEVEL 2 | DIRECTOR |
| PRINT PRIORITY LEVEL 3 | MANAGER |
| PRINT PRIORITY LEVEL 4 | CHIEF |
| PRINT PRIORITY LEVEL 5 (LOW) | CLERK |

FIG.19

| | JOB 111 | JOB 112 |
|---|---|---|
| USER STATUS | MANAGER (PRINT PRIORITY LEVEL: 3) | CHIEF (PRINT PRIORITY LEVEL: 4) |
| NUMBER OF PAGES | 3 | 5 |
| COLOR MODE | FULL COLOR | BLACK AND WHITE |
| NUMBER OF COPIES | 2 | 3 |
| DOUBLE-SIDED OR SINGLE-SIDED PRINTING | DOUBLE-SIDED | SINGLE-SIDED |
| STAPLING | YES | NO |
| USER ID | A | B |
| BINDING | YES | YES |
| BOX NUMBER | 1 | 2 |

FIG.21

|  | CARD INFORMATION (1) | CARD INFORMATION (2) | CARD INFORMATION (3) |
|---|---|---|---|
| PRINT PRIORITY LEVEL 1 (HIGH) | BLACK | CORPORATE CARD | DEPARTMENT STAFF MEMBER'S CARD |
| PRINT PRIORITY LEVEL 2 | GOLD | PERSONAL | VISITOR CARD |
| PRINT PRIORITY LEVEL 3 | SILVER |  |  |
| PRINT PRIORITY LEVEL 4 | BRONZE |  |  |
| PRINT PRIORITY LEVEL 5 (LOW) | CLASSIC |  |  |

FIG.22

| | JOB 111 | JOB 112 |
|---|---|---|
| CARD STATUS | GOLD (PRINT PRIORITY LEVEL: 2) | CLASSIC (PRINT PRIORITY LEVEL: 5) |
| NUMBER OF PAGES | 3 | 5 |
| COLOR MODE | FULL COLOR | BLACK AND WHITE |
| NUMBER OF COPIES | 2 | 3 |
| DOUBLE-SIDED OR SINGLE-SIDED PRINTING | DOUBLE-SIDED | SINGLE-SIDED |
| STAPLING | YES | NO |
| USER ID | A | B |
| BINDING | YES | YES |
| BOX NUMBER | 1 | 2 |

FIG.28

| | JOB 131 | JOB 132 | JOB 133 | JOB 134 |
|---|---|---|---|---|
| NUMBER OF PAGES | 3 | 5 | 3 | 5 |
| COLOR MODE | FULL COLOR | BLACK AND WHITE | FULL COLOR | BLACK AND WHITE |
| NUMBER OF COPIES | 2 | 3 | 2 | 3 |
| DOUBLE-SIDED OR SINGLE-SIDED PRINTING | DOUBLE-SIDED | SINGLE-SIDED | DOUBLE-SIDED | SINGLE-SIDED |
| STAPLING | YES | NO | YES | NO |
| USER ID | A | B | A | B |
| BINDING | YES | NO | NO | YES |
| BOX NUMBER | 1 | 2 | 1 | 2 |

FIG.30

|  | JOB 141 | JOB 142 |
|---|---|---|
| CARD STATUS | GOLD (PRINT PRIORITY LEVEL: 2) | CLASSIC (PRINT PRIORITY LEVEL: 5) |
| NUMBER OF PAGES | 3 | 5 |
| COLOR MODE | FULL COLOR | BLACK AND WHITE |
| NUMBER OF COPIES | 2 | 3 |
| DOUBLE-SIDED OR SINGLE-SIDED PRINTING | DOUBLE-SIDED | SINGLE-SIDED |
| STAPLING | YES | NO |
| USER ID | A | B |
| USER JOB TITLE | MANAGER (PRINT PRIORITY LEVEL: 3) | DIRECTOR GENERAL (PRINT PRIORITY LEVEL: 1) |
| BINDING | YES | YES |
| BOX NUMBER | 1 | 2 |

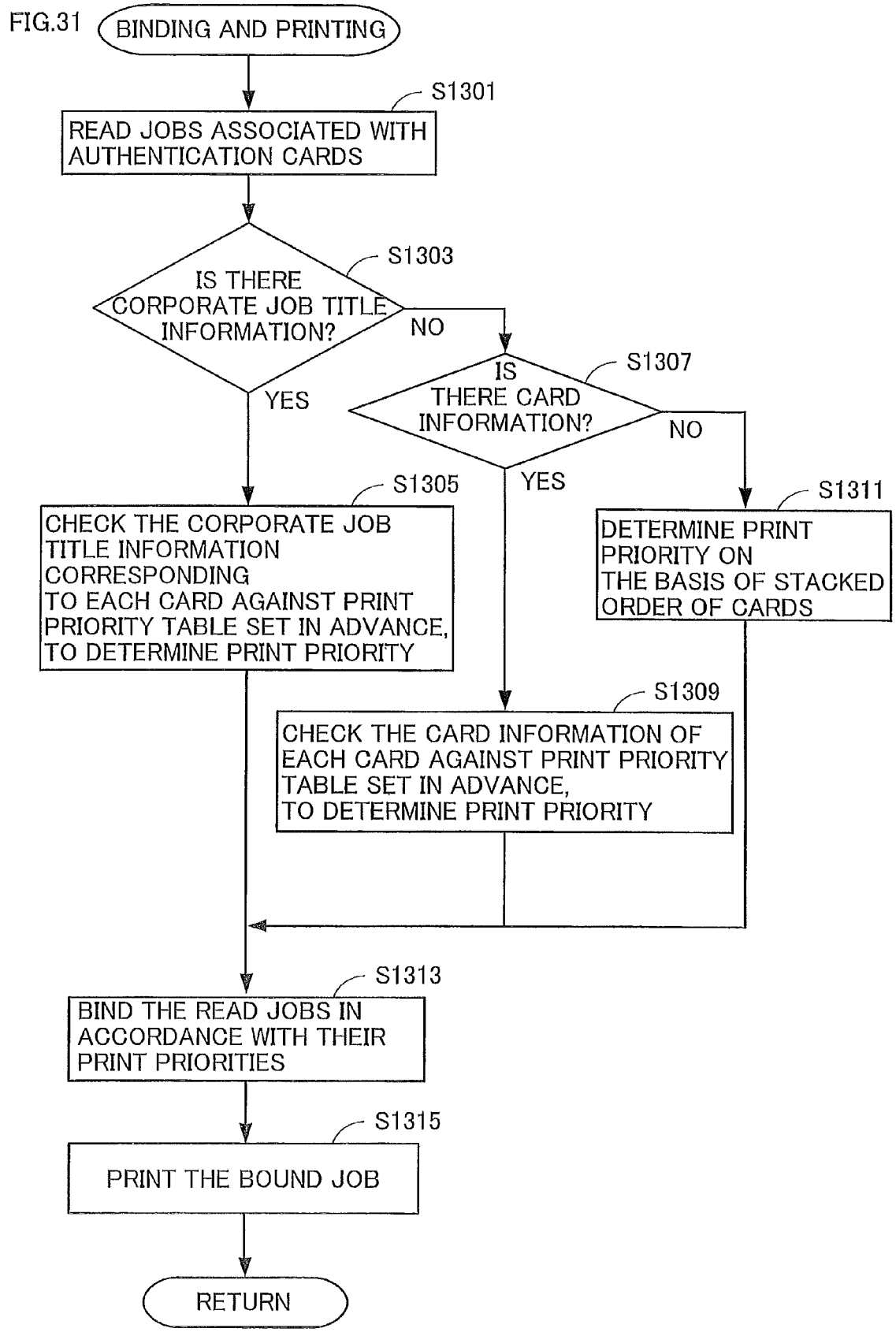

IMAGE OUTPUT DEVICE WHICH, WHEN AUTHENTICATION MEDIA ARE READ BY AUTHENTICATION DEVICE, EXECUTES JOBS STORED IN STORAGE MEDIUM ON THE BASIS OF RESULT OF AUTHENTICATION

This application is based on Japanese Patent Application No. 2009-69899 filed with the Japan Patent Office on Mar. 23, 2009, the entire content of which is hereby incorporated by reference.

BACKGROUND OF THE INVENTION

1. Field of the Invention

The present invention relates to an image output device, and more particularly to an image output device which, when authentication media are read by an authentication device, executes jobs stored in a storage medium on the basis of a result of the authentication.

2. Description of the Related Art

Image forming devices (such as a multi function peripheral (MFP) provided with the scanner function, facsimile transmitting/receiving function, copying function, function as a printer, data communicating function, and server function, a facsimile machine, a copier, a printer, and the like) may be provided with an authentication printing function. The authentication printing function is a function with which, when an authentication card or the like is read by an authentication device, a print job stored in a storage medium is executed on the basis of the authentication result. According to the authentication printing function, only the user having the authentication card is allowed to execute the job, which guarantees a high level of security.

Document 1 below discloses an image forming device in which, after an authenticated job is printed, the print data stored in print data storing means is printed again when authentication information is input.

An image forming device provided with a function of combining a plurality of jobs and outputting the same as a set of printouts is also known.

Document 2 below discloses an image output device in which a plurality of electronic documents acquired from a web server or the like are combined so that they are output consecutively. The electronic documents to be combined are designated by a user. With this image output device, the electronic documents may be combined for printing, and the printed matters may be stapled for output.

[Document 1] Japanese Patent Application Laid-Open No. 2006-076034

[Document 2] Japanese Patent Application Laid-Open No. 2005-169838

In the case where a plurality of jobs are to be output collectively, as described in Document 2 above, when the authentication printing as described in Document 1 above is tried for the purposes of guaranteeing security, the following problems may occur.

For example, assume that jobs of two users are about to be output collectively. In order to combine the jobs, it is necessary to access the jobs. In the case where the image forming device allows authentication of only one person at a time, as described in Document 1 above, troublesome procedure is required for combining the jobs. That is, a first user passes a data file of the first user's job to a second user. The second user in turn performs authentication and stores the received data file as the second user's own job. This allows the second user to access the jobs of both users. The second user then issues an instruction to combine the jobs.

In the above-described case, the first user is required to pass the own data file to the second user, and the second user is required to select the jobs to be combined and instruct the output thereof. These operations are complicated and troublesome.

These problems are not limited to the image forming devices like an MFP; they are common to image output devices in general, including a scanner, which have the function of outputting images.

SUMMARY OF THE INVENTION

The present invention has been accomplished to solve the foregoing problems, and an object of the present invention is to provide an image output device which is capable of outputting a plurality of jobs collectively, without the need of complicated operations, while guaranteeing a high level of security.

To achieve the above object, according to an aspect of the present invention, an image output device is for executing jobs stored in a storage medium, when a plurality of authentication media are read by an authentication device, on the basis of a result of the authentication, and includes: a processing unit configured to retrieve, from among the jobs stored in the storage medium, a plurality of jobs associated with the plurality of authentication media read by the authentication device, and combine the plurality of jobs into a smaller number of jobs; and an image output unit configured to output images by executing the job combined by the processing unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows, by way of example, data stored in a HDD;

FIG. 18 shows a print priority table which is set in the MFP according to a fifth embodiment;

FIG. 19 shows, by way of example, job data stored in the HDD;

FIG. 21 shows a print priority table which is set in the MFP according to a sixth embodiment;

FIG. 22 shows, by way of example, job data stored in the HDD;

FIG. 28 shows, by way of example, job data stored in the HDD;

FIG. 30 shows, by way of example, job data stored in the HDD; and

FIG. 31 is a flowchart illustrating the binding and printing process performed by the MFP according to a tenth embodiment.

DESCRIPTION OF THE PREFERRED EMBODIMENTS

Hereinafter, embodiments of an image output device according to the present invention will be described.

The image output device is a multi function peripheral (MFP) which is provided with the scanner function, the copying function, the function as a printer, the facsimile transmitting/receiving function, the data communicating function, and the server function. Such an MFP is called a digital composite machine. With the scanner function, the MFP reads an image from a document that has been set, and stores it in a hard disk drive (HDD) or the like. With the copying function, it prints the image on a sheet of paper or the like. With the function as a printer, it receives a printing instruction from an external terminal such as a personal computer (PC) and performs printing on a sheet of paper based on the instruction. With the facsimile transmitting/receiving function, it receives facsimile data from an external facsimile machine or the like and stores the data in the HDD. With the data communicating function, it transmits data to and receives data from an external device connected thereto. With the server function, it allows a plurality of users to share, e.g., the data stored in the HDD.

First Embodiment

A hardware configuration of the MFP (as an example of the image output device) according to a first embodiment will now be described.

Figure 1:
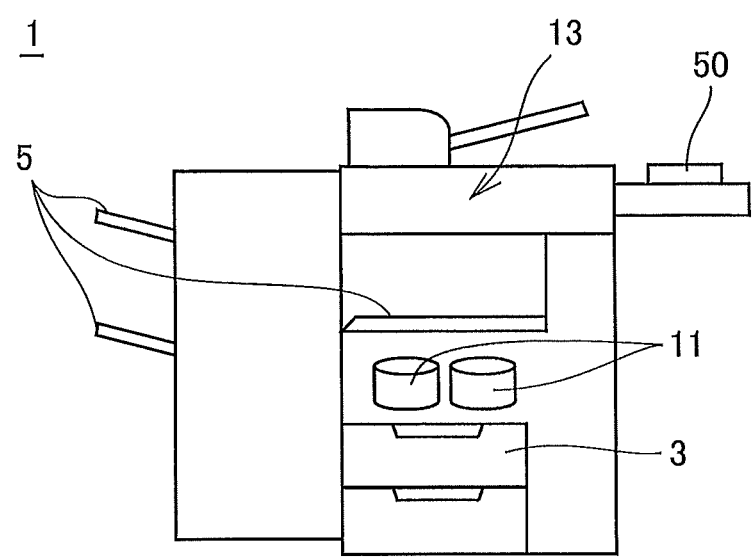
FIG. 1 is a front view of an MFP (as an example of the image output device) according to a first embodiment of the present invention.

Referring to FIG. 1, an MFP 1 includes a paper feed cassette 3, a paper discharge tray 5, a HDD (storage medium) 11, and a scanning unit 13.

Paper feed cassette 3 stores sheets of paper for forming images thereon. Paper feed cassette 3 has a sensor which checks whether there is a stock of sheets of paper. If the paper is not set, or if the paper is running out during the printing operation, the sensor detects the event and notifies the user to that effect through, e.g., an operation panel 25 which will be described later.

MFP 1 has, e.g., three paper discharge trays 5, one being arranged at the center of MFP 1, and the other two being arranged on a side of MFP 1, one on top of the other. The sheets printed in MFP 1 are discharged from within MFP 1 to one of these paper discharge trays 5.

HDD 11 is housed within the enclosure of MFP 1. Scanning unit 13 is arranged at the top of the enclosure of MFP 1.

MFP 1 is connected with an authentication device 50. Authentication device 50 is arranged on a support table which is provided on a side of scanning unit 13. This allows the user to readily perform card authentication, which will be described later.

Figure 2:
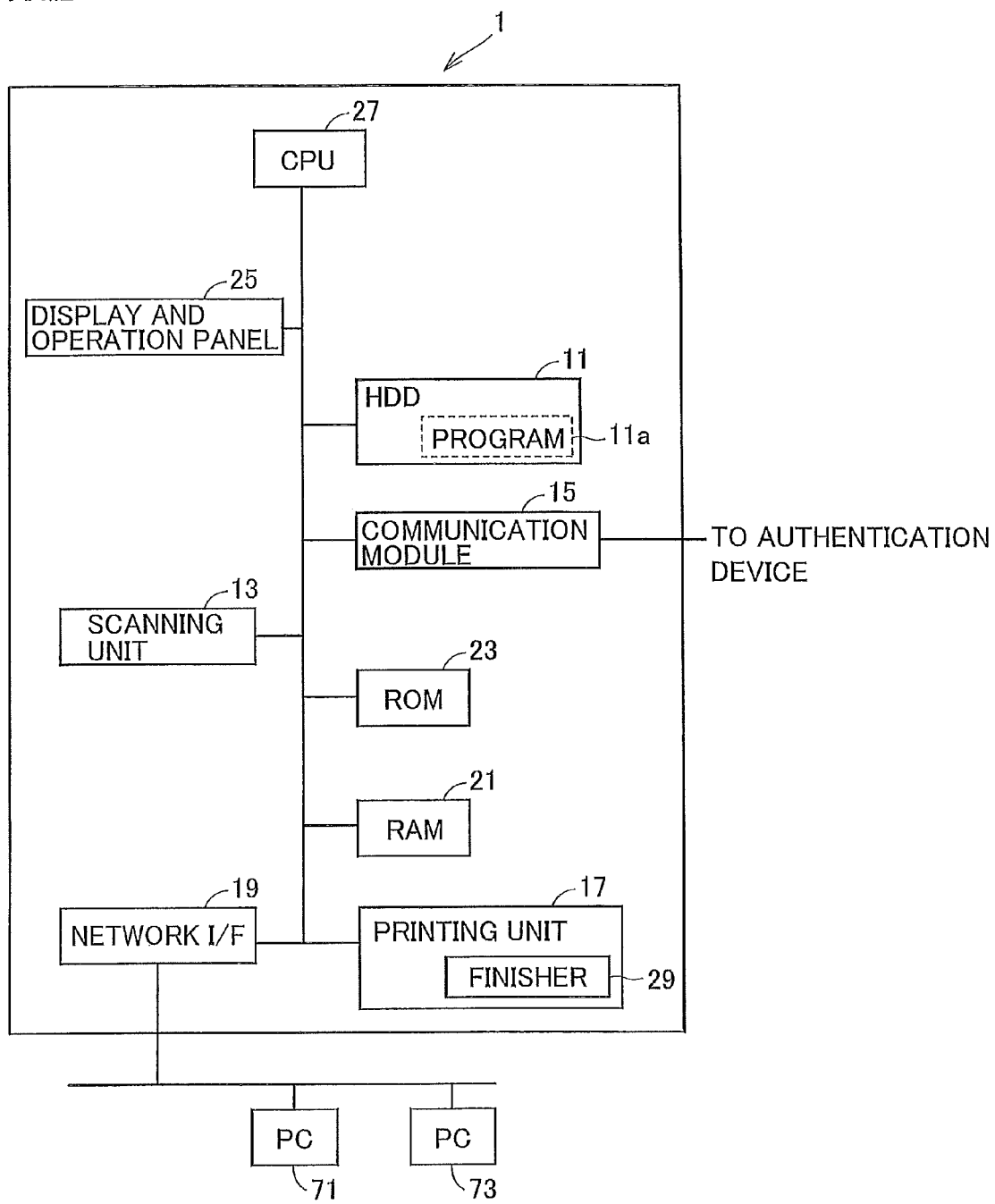
FIG. 2 is a block diagram showing a hardware configuration of the MFP.

FIG. 2 shows the hardware configuration of MFP 1.

Referring to FIG. 2, MFP 1 further includes a communication module 15, a printing unit 17, a network interface (I/F) 19, a random access memory (RAM) 21, a read only memory (ROM) 23, operation panel (display and operation panel) 25, and a central processing unit (CPU) 27. These elements in MFP 1 are connected to a system bus, so that they can transmit/receive signals to/from one another.

HDD 11 stores job data externally transmitted via network I/F 19, and image data read by scanning unit 13. HDD 11 also stores an authentication table for use in card authentication, as will be described later, setting information for MFP 1, control programs 11a for various operations of MFP 1, and others. HDD 11 may store a plurality of jobs transmitted from one or more client PCs.

In HDD 11, a plurality of BOXes are set as the data storage locations. The BOXes are storage areas which are set in association with individual users or groups of predetermined users. Each BOX may store a plurality of pieces of data. For example, CPU 27 stores the job data transmitted from PCs 71, 73 and the image data read by scanning unit 13 in the BOXes. This allows the data to be stored in HDD 11 in a classified and organized manner. CPU 27 restricts access to each BOX in accordance with success/failure of authentication or the like. This guarantees security of the data stored in the BOXes. CPU 27 may move or duplicate the data between the BOXes.

Scanning unit 13 executes the above-described scanner function. Scanning unit 13 uses a contact image sensor to scan the document arranged on a transparent platen glass so as to read image data. Scanning unit 13 uses an auto document feeder (ADF) to sequentially take in a plurality of documents set in a document tray, and reads the image data by the contact image sensor. The read image data is converted into an application data format by CPU 27 and stored in the BOXes or the like. CPU 27 may transmit the image data stored in the BOXes or the like to PCs 71 and 73.

Communication module 15 is, e.g., a universal serial bus (USB) interface, which enables communication between MFP 1 and an external device connected via a communication cable. Communication module 15 is connected with authentication device 50 via a USB cable.

Printing unit 17 feeds a sheet of paper from paper feed cassette 3 into MFP 1. Printing unit 17 forms an image on the sheet of paper by electrophotography, and discharges it to one of the three paper discharge trays 5. The tray to which the sheet is to be discharged is set, under the control of CPU 27, to the one selected by the user, for example. Printing unit 17 is capable of printing image data which has been read by scanning unit 13 and converted into a printable form. Printing unit 17 is also capable of printing image data of an application data format which has been transmitted from PC 71 or stored in HDD 11 and converted into a printable form. CPU 27 converts the data into a printable form by using RAM 21 or the like. Printing unit 17 may form a color image on a sheet of paper. Alternatively, printing unit 17 may form only a black-and-white image thereon.

Printing unit 17 includes a finisher 29. Finisher 29 may include a stapling unit (not shown), a sorting unit (not shown), or a stamping unit (not shown). The stapling unit staples a plurality of pages of printouts for each set and outputs the stapled sets onto paper discharge tray 5. The sorting unit sorts a plurality of pages of printouts for each set and outputs the sorted sets onto paper discharge tray 5, while changing the orientations or output positions. The stamping unit stamps a predetermined mark on a plurality of pages of printouts and outputs them collectively onto paper discharge tray 5. When these functions of finisher 29 are used to output a plurality of sets of printouts, the sheets are readily organized into the respective sets. The functions using finisher 29 may be performed as appropriate, under the control of CPU 27, in accordance with the settings by a user.

Network I/F 19 is made up of a combination of a hardware unit which includes a network interface card (NIC) and a software unit which performs communication in accordance with a predetermined communication protocol. Network I/F 19 connects MFP 1 to an external network such as a local area network (LAN), whereby MFP 1 is capable of communicating with external devices such as client PCs connected to the external network. In FIG. 2, MFP 1 is connected to an external network to which PCs 71 and 73 are connected. MFP 1 can receive jobs from PCs 71 and 73. MFP 1 can transmit image data read by scanning unit 13 to PC 71, or transmit the same via e-mail using a mail server. Network I/F 19 may be connected to the external network via radio communication.

RAM 21 is a main memory for CPU 27. RAM 21 is used to store data which is necessary when CPU 27 executes a control program 11*a*, as will be described later.

ROM 23 is, e.g., a flash ROM (flash memory). ROM 23 stores data used by MFP 1 to perform various operations. ROM 23, like HDD 11, may store various control programs as well as setting data for the functions of MFP 1. CPU 27 performs predetermined processing to read data from or write data to ROM 23. ROM 23 may be non-rewritable.

Operation panel (display and operation panel) 25 is configured with a liquid crystal display (LCD) having a touch panel function. Operation panel 25 has the function of displaying an image on the LCD and the function of accepting a user operation through the touch panel. Operation panel 25, under the control of CPU 27, displays a predetermined operation menu screen on the LCD so as to accept an operation from the user. Operation panel 25 also displays information regarding the status of MFP 1 for notification to the user. When the operation of the user is accepted by operation panel 25, an operation signal or command corresponding thereto is transmitted to CPU 27.

CPU 27 executes control programs 11*a* stored in HDD 11 or the like, to control various operations of MFP 1. When an operation signal is received from operation panel 25 or an operation command is received from PC 71 or the like, CPU 27 executes predetermined control program 11*a* in accordance with the signal or command. As a result, a predetermined operation is carried out by MFP 1 in accordance with the user operation made on operation panel 25 or the instruction received from PC 71.

Now, the hardware configuration of authentication device 50 according to the present embodiment and an authentication card (as an example of the authentication medium) 90 will be described.

Figure 3:
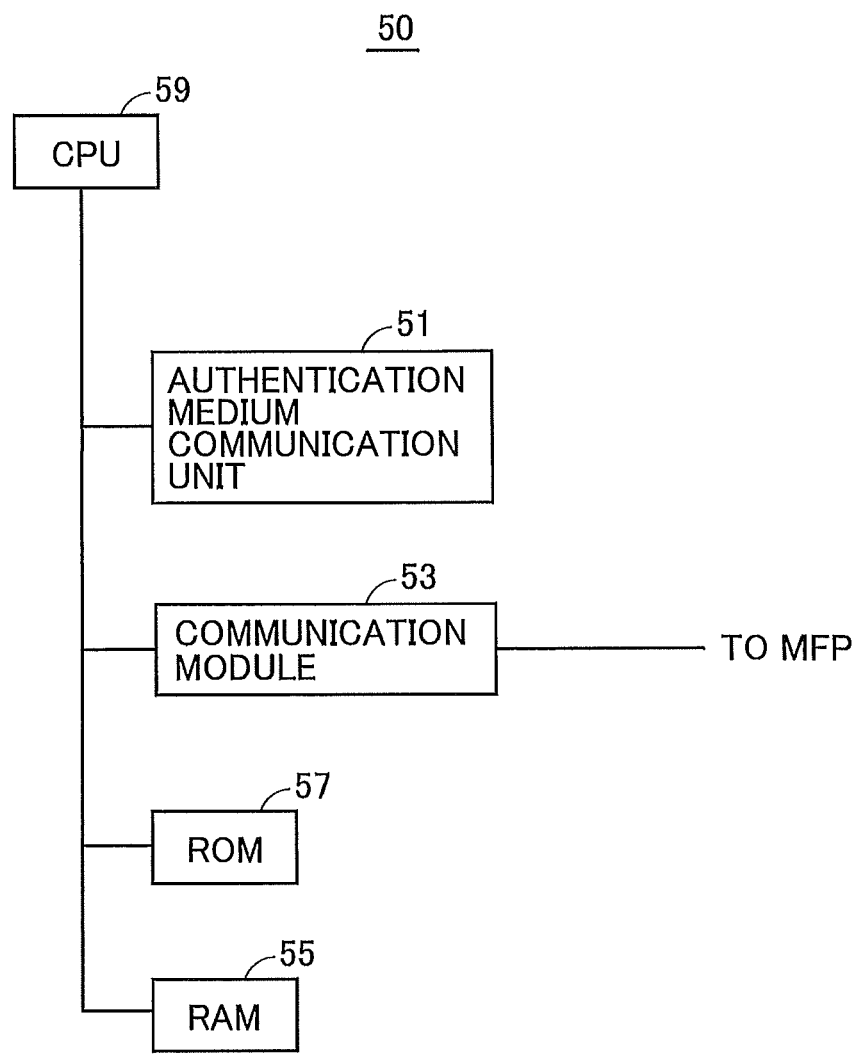
FIG. 3 is a block diagram showing a hardware configuration of an authentication device.

FIG. 3 shows the hardware configuration of authentication device 50.

Referring to FIG. 3, authentication device 50 includes an authentication medium communication unit 51, a communication module 53, a RAM 55, a ROM 57, and a CPU 59. Authentication device 50 is, e.g., a contactless IC card reader. Authentication device 50 may perform radio communication, or contactless communication, with authentication card (authentication medium) 90, which will be described later.

Authentication medium communication unit 51 includes an antenna and a radio circuit for generating a magnetic field for communicating with authentication card 90, and a circuit for demodulating and decoding received information. Authentication medium communication unit 51 operates under the control of CPU 59.

Communication module 53 is, e.g., a USB interface. Communication module 53 is connected to communication module 15 in MFP 1 via a USB cable. In this manner, authentication device 50 is connected to MFP 1 in a communicable manner.

CPU 59 executes the control programs stored in ROM 57 or the like, using RAM 55, to thereby control various operations of authentication device 50. CPU 59 communicates with MFP 1 and, based on the result, executes various control programs. When authentication card 90 is brought close to authentication medium communication unit 51, CPU 59 executes various control programs.

When authentication card 90 is brought close to authentication medium communication unit 51, CPU 59 detects it. CPU 59 then uses authentication medium communication unit 51 to read the information stored in authentication card 90, as will be described later. CPU 59 transmits the read information to MFP 1.

Figure 4:
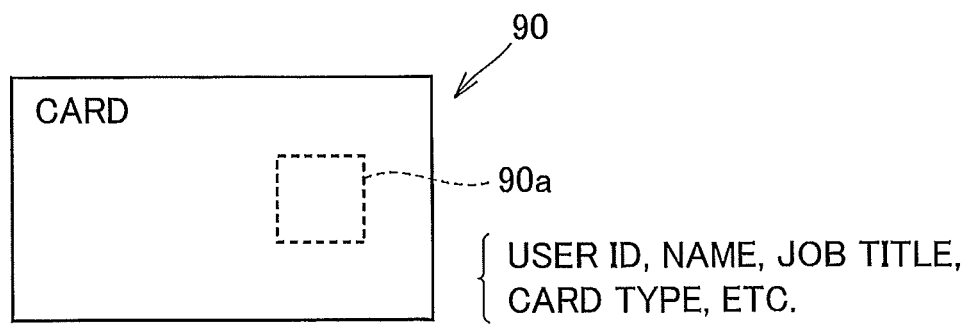
FIG. 4 is a top plan view of an authentication card.

FIG. 4 is a top plan view of authentication card 90.

Authentication card 90 is, e.g., a contactless IC card. An IC unit 90*a* and an antenna (not shown) are embedded in authentication card 90. When authentication card 90 is brought close to the antenna of authentication medium communication unit 51, a current is generated on the antenna of authentication card 90 by electromagnetic induction. IC unit 90*a* is driven by the current as a power supply. IC unit 90*a*, when driven, modulates the information stored therein and outputs radio waves via the antenna. Authentication device 50 receives and demodulates the radio waves to thereby read the information stored in authentication card 90.

Authentication card 90 is issued to each user of MFP 1 so as to be used for authentication of the user. IC unit 90*a* in authentication card 90 issued to each user stores therein user attribute information related to the user and card information (card type information) related to the authentication card 90.

The user attribute information shows attributes of the individual user who possesses the authentication card 90. The user attribute information includes information about the user such as a user ID, name, age, gender, and job title (job rank or class).

The card information shows the category to which the authentication card 90 belongs. Here, each authentication card 90 belongs to one of a predetermined number of types of categories set in advance. The categories of authentication cards 90 may be set in correspondence with the card classes including black, gold, and classic. The categories may be set in accordance with the companies for which the users work, in which case there may be corporate cards and personal cards. The categories may also be set in accordance with the departments to which the users belong at the office.

The user attribute information and the card information are not restricted to those described above. The user attribute information may include information about the user's affiliation and the like. IC unit 90a may store the user attribute information alone; it does not necessarily have to store the card information.

MFP 1 has a card authentication function of performing authentication of authentication card 90. The card authentication function may be used to permit/prohibit printing of individual documents, or restrict the use of the respective functions of MFP 1, for a user who possesses the authenticated card. For example, in the state where the user has not performed card authentication, even when CPU 27 receives a job from PC 71 or the like, CPU 27 does not output the job but stores the job data in a predetermined BOX within HDD 11. When the user performs card authentication afterwards, CPU 27 outputs the job corresponding to the user (which function may be called a "touch-and-print function"). This guarantees a high level of security for MFP 1.

User authentication is performed using the user attribute information which has been read from authentication card 90 by authentication device 50 and transmitted to MFP 1. Specifically, CPU 27 compares the user ID extracted from the user attribute information with each of the user IDs included in an authentication table to perform card authentication of the user. In the authentication table, registration data including the user IDs for the users who may be authenticated are set. The authentication table may be read from HDD 11 or from a server (not shown) connected to the external network.

When a plurality of authentication cards 90 stacked on one another are brought close to authentication medium communication unit 51, authentication device 50 performs radio communication with each of authentication cards 90. At this time, CPU 59 reads information from each authentication card 90. In MFP 1, card authentication is performed for each of authentication cards 90 from which the information has been read.

Figure 5:
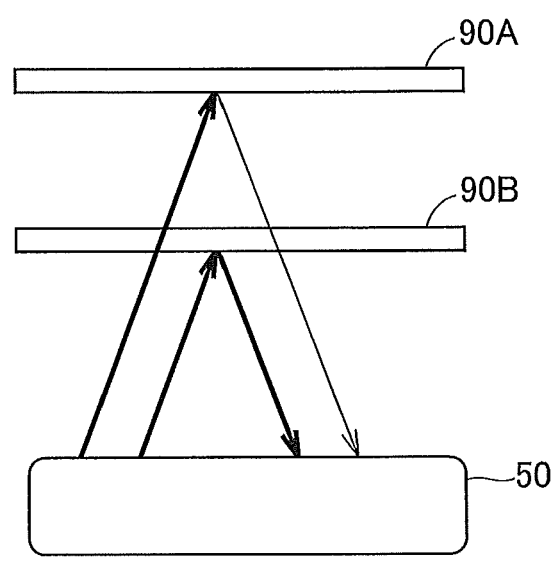
FIG. 5 is a side view of the authentication device which is reading a plurality of authentication cards.

FIG. 5 shows authentication device 50 which is reading a plurality of authentication cards 90A and 90B.

Here, assume that two authentication cards 90A and 90B are brought close to authentication device 50, as shown in FIG. 5. When authentication device 50 detects that authentication cards 90A and 90B are brought close thereto, authentication device 50 outputs radio waves toward authentication cards 90A and 90B to drive the cards. Authentication cards 90A and 90B each output radio waves including the information stored within the corresponding card. Authentication device 50 receives the radio waves output from authentication cards 90A and 90B to read the information from the respective cards. Although two authentication cards 90A and 90B are shown in FIG. 5, in the case where a greater number of authentication cards 90 are brought close to authentication device 50 as well, authentication device 50 reads information from the respective cards.

CPU 27 determines the stacked order of authentication cards 90A and 90B on the basis of information, transmitted from authentication device 50, about the intensities of the radio waves received from authentication cards 90A and 90B or about the times of reception of the radio waves from the respective cards. For example, assume that authentication card 90A is located more distant from authentication device 50 than authentication card 90B, as shown in FIG. 5. At this time, the intensity of the radio waves output from authentication card 90A and received at authentication device 50 is lower than the intensity of the radio waves output from authentication card 90B and received at authentication device 50. The time taken from when authentication device 50 outputs radio waves toward a card to when authentication device 50 detects radio waves returning from the card is longer for authentication card 90A than for authentication card 90B. Therefore, CPU 27 determines that authentication card 90A is more distant from authentication device 50 than authentication card 90B, on the basis of the intensities of the received radio waves or the times until when the radio waves are detected.

In the case where a plurality of authentication cards 90 are detected within a predetermined period of time, CPU 27 regards that a plurality of users have performed card authentication at the same time (which may be called "simultaneous authentication"). There are largely two cases of simultaneous authentication: first simultaneous authentication and second simultaneous authentication. The first simultaneous authentication corresponds to the case where a plurality of authentication cards 90 for the plurality of users are stacked on one another, and the stack is brought close to authentication device 50, as described above. The second simultaneous authentication corresponds to the case where a plurality of users perform card authentication consecutively. In the first simultaneous authentication, the plurality of authentication cards 90 are simultaneously read by authentication device 50 and authenticated. In the second simultaneous authentication, the plurality of authentication cards 90 are not read simultaneously in the strict sense. However, if card authentication of one user is followed by card authentication of another user within a predetermined period of time (within ten seconds, for example), CPU 27 determines that the two users have been authenticated simultaneously. Thus, for example in the case where three users perform card authentication at an interval of a predetermined time or less between the first user and the second user and between the second user and the third user, the second simultaneous authentication is fulfilled for authentication cards 90 of the three users. In the case where the first simultaneous authentication and the second simultaneous authentication are performed consecutively within a predetermined period of time (within ten seconds, for example), it may be determined that the simultaneous authentication has been accomplished for all the authentication cards 90 detected in the first and second simultaneous authentication. In the following, it may be alternatively determined that the simultaneous authentication for a plurality of authentication cards 90 has been accomplished only when the first or second simultaneous authentication is performed.

In the present embodiment, MFP 1 has a job binding function (binding function). The binding function is performed utilizing the card authentication function described above. As used herein, "binding" is not limited to the concept of book binding. It may also include the concept of simply combining, organizing, or joining the objects. MFP 1 uses the binding function to combine a plurality of jobs into a smaller number of jobs (which may be one job). In the binding process, MFP 1 executes the resultant (combined) job, so that the printed matters for the plurality of jobs are output collectively as a set of printouts. The binding function is carried out, when the simultaneous authentication is performed for a plurality of authentication cards 90, in accordance with a result of the authentication.

According to the binding function, the jobs may be printed out in the following manner. Assume that two jobs are stored in MFP 1. In this case, the binding function may be used to combine the jobs into one set of documents, with two jobs arranged in succession, and print out one or more sets of copies of the documents. At this time, finisher 29 may be used to staple each set of copies or sort the respective sets of copies before being output onto paper discharge tray 5. Finisher 29 may also be used to stamp each set of copies before being output. According to the binding function, three or more jobs may be combined and output in a similar manner.

Hereinafter, the job binding function will be described. Firstly, the binding function will be described in brief.

Figure 6:
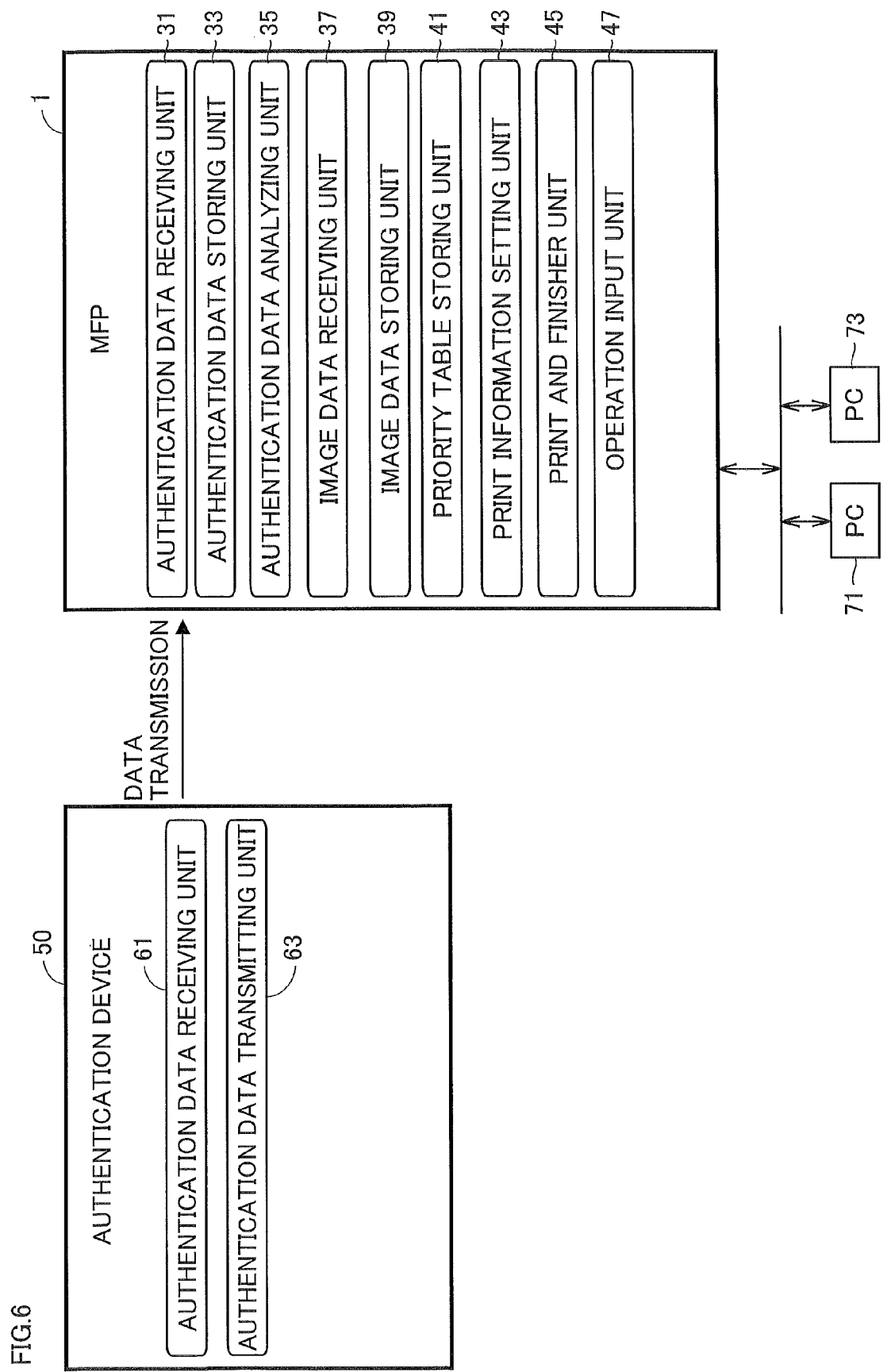
FIG. 6 is a block diagram showing the functional configurations of the MFP and the authentication device.

FIG. 6 shows the functional configurations of MFP 1 and authentication device 50. The job binding function is carried out using the following functions of MFP 1 and authentication device 50.

Referring to FIG. 6, authentication device 50 includes an authentication data receiving unit 61 and an authentication data transmitting unit 63.

Referring also to FIG. 6, MFP 1 includes an authentication data receiving unit 31, an authentication data storing unit 33, an authentication data analyzing unit 35, an image data receiving unit 37, an image data storing unit 39, a priority table storing unit 41, a print information setting unit 43, a print and finisher unit 45, and an operation input unit 47. MFP 1 is capable of communicating with PCs 71 and 73 which are connected to the external network.

Figure 7:
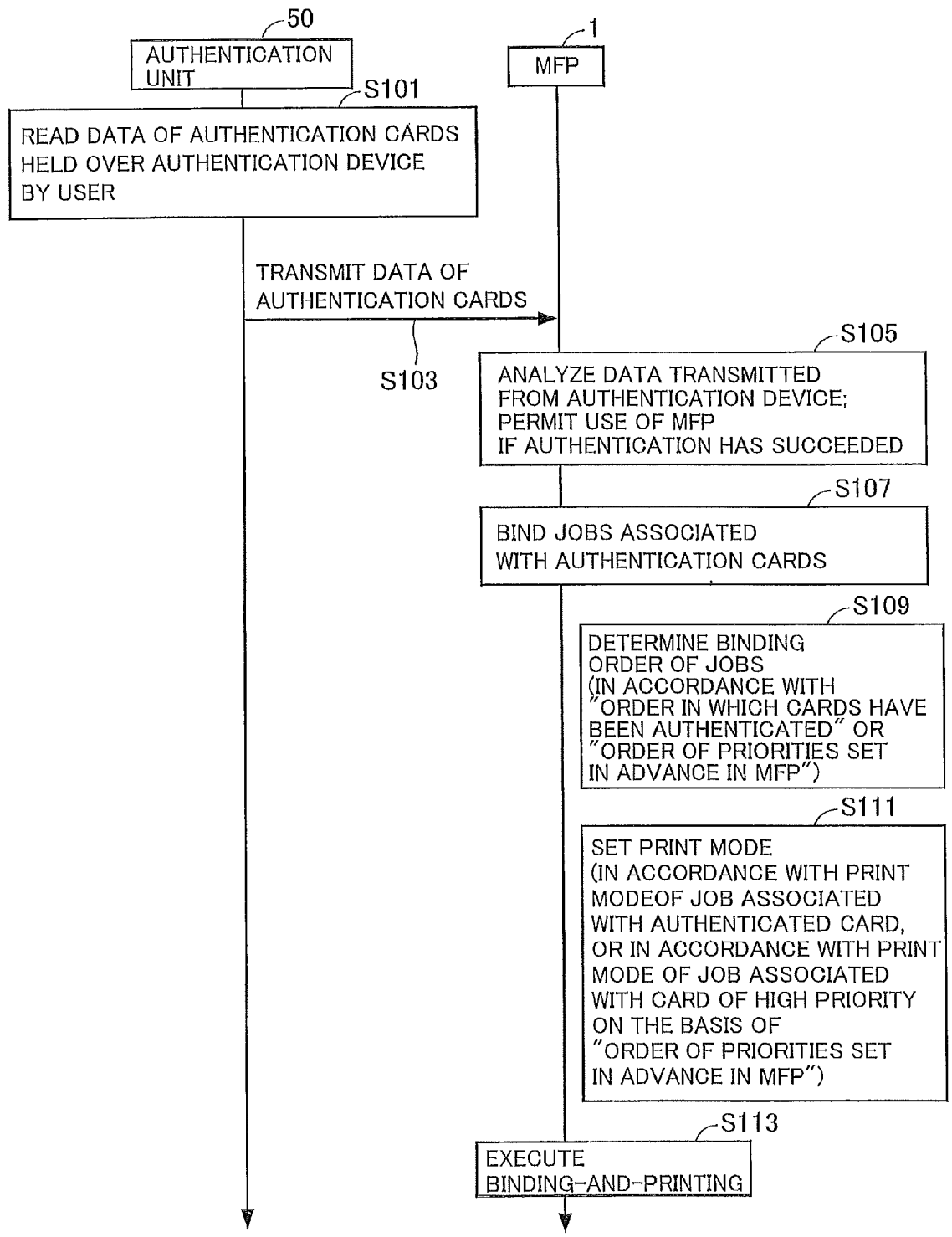
FIG. 7 is a sequence diagram schematically showing the operations of the MFP and the authentication device.

FIG. 7 schematically shows the operations of MFP 1 and authentication device 50.

MFP 1 cooperates with authentication device 50 to perform the binding function in a manner generally shown in FIG. 7. The binding function is carried out under the control of CPU 27.

MFP 1 stores a plurality of pieces of job data prior to execution of the binding function. The jobs are transmitted from external PCs 71, 73, and the like. At this time, each job is received by image data receiving unit 37 and stored, e.g., in a predetermined BOX in HDD 11 by image data storing unit 39.

In step S101, in authentication device 50, authentication data receiving unit 61, under the control of CPU 59, reads the data of a plurality of authentication cards 90 which are held over authentication device 50 by a user. The data are read from authentication cards 90 in the above-described manner.

In step S103, authentication data transmitting unit 63, under the control of CPU 59, transmits the data of authentication cards 90, read by authentication data receiving unit 61, from authentication device 50 to MFP 1.

In step S105, in MFP 1, authentication data receiving unit 31 receives the data transmitted from authentication device 50. Authentication data storing unit 33 stores the received data in a BOX in HDD 11, for example Authentication data analyzing unit 35 performs analysis of the data received from authentication device 50. CPU 27 then performs card authentication based on a result of the analysis. When the card is authenticated, CPU 27 lifts the restriction on the use of MFP 1 placed on the user who possesses the authenticated card 90, to allow the user to perform the functions of MFP 1.

In the case where the simultaneous authentication has been performed, in step S107, print and finisher unit 45 combines (binds) the jobs. Specifically, a plurality of jobs which are associated with authentication cards 90 read by authentication device 50 are combined in a manner which will be described later.

Print and finisher unit 45 may organize the plurality of jobs so that they are output in a predetermined order (S109). Specifically, print and finisher unit 45 organizes the jobs in accordance with the order in which authentication cards 90 have been authenticated, the order of priorities of the jobs, or the like, so that the jobs are output in the predetermined order. The orders in which the jobs are bound will be described later in detail. Priority table storing unit 41 stores a print priority table which is referred to for determining the priorities of the jobs.

Print information setting unit 43 may set a print mode for the combined job (S111). For example, the print mode (the way of printing) may be set in accordance with the print mode of the job that is associated with the authenticated card 90, or in accordance with the print mode of the job that is selected in accordance with the priority. The print mode corresponding to a predetermined one of the jobs which have been combined may be adopted, or the print mode may be set in accordance with the user operation accepted by operation input unit 47. Settings of the print mode will be described later in detail in another embodiment.

When the jobs are combined in step S107, print and finisher unit 45 performs a binding and printing process in step S113. In this manner, the combined job is output as a set of printouts.

The binding function will now be described in detail. In the present embodiment, authentication device 50 operates in the following manner.

Figure 8:
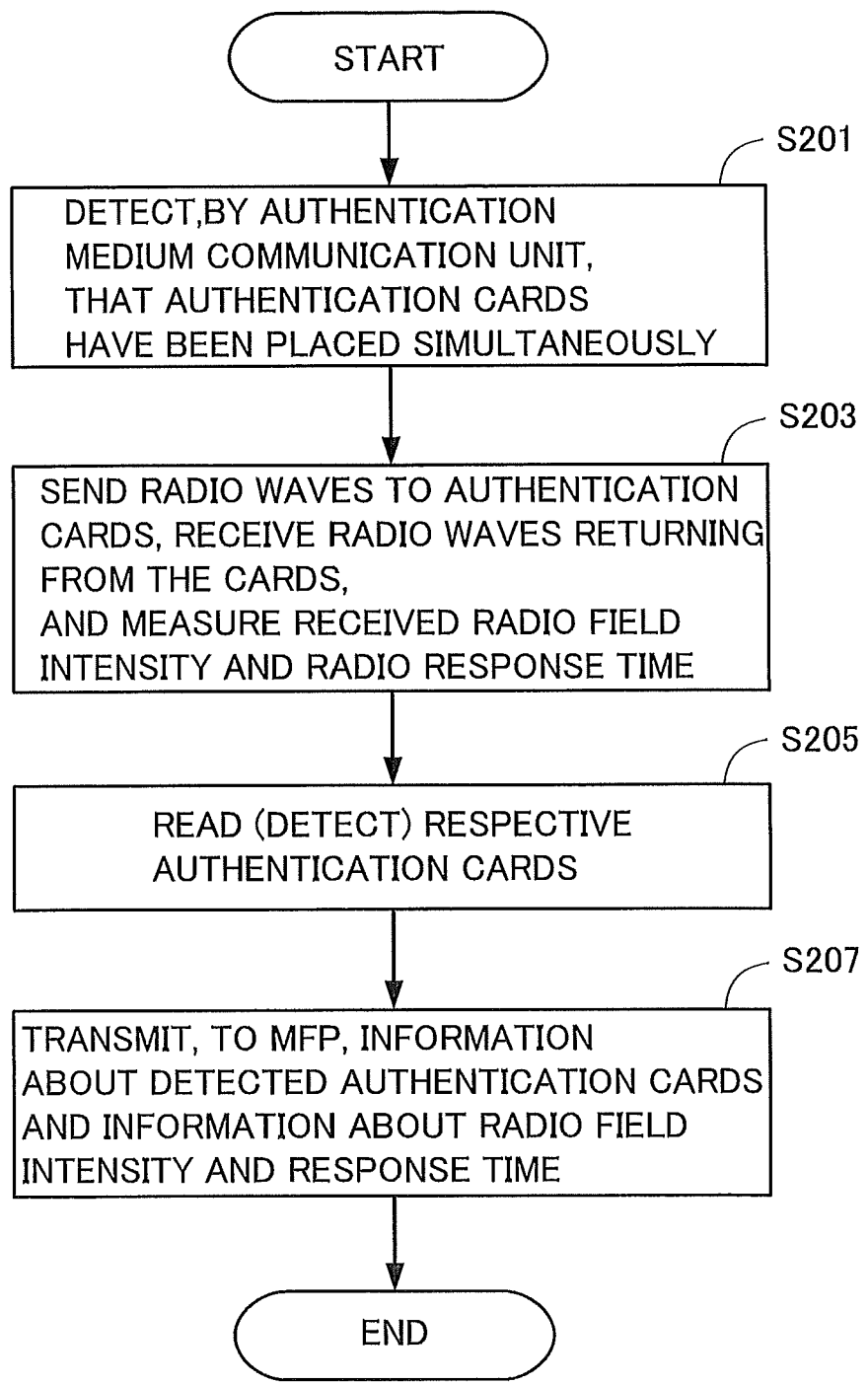
FIG. 8 is a flowchart illustrating the operations of the authentication device according to the first embodiment.

FIG. 8 is a flowchart illustrating the operations of authentication device 50 according to the first embodiment.

In step S201, CPU 59 detects that a plurality of authentication cards 90 have been placed on authentication medium communication unit 51. Alternatively, CPU 59 may detect that authentication cards 90 have been brought close to authentication medium communication unit 51.

In step S203, CPU 59 causes authentication medium communication unit 51 to output radio waves toward the plurality of authentication cards 90 and receive radio waves returning from the cards. Further, for each of authentication cards 90, the radio field intensity of the received radio waves (hereinafter, simply referred to as the "received radio field intensity") and the time taken from when the radio waves are output to when the radio waves are received (hereinafter, simply referred to as the "radio response time") are measured.

In step S205, CPU 59 reads (detects) the user attribute information and the card information from each authentication card 90.

In step S207, CPU 59 transmits to MFP 1 the user attribute information and the card information detected, the information about the received radio field intensity, and the information about the radio response time.

On the other hand, MFP 1 operates in the following manner so as to perform the binding function.

Figure 9:
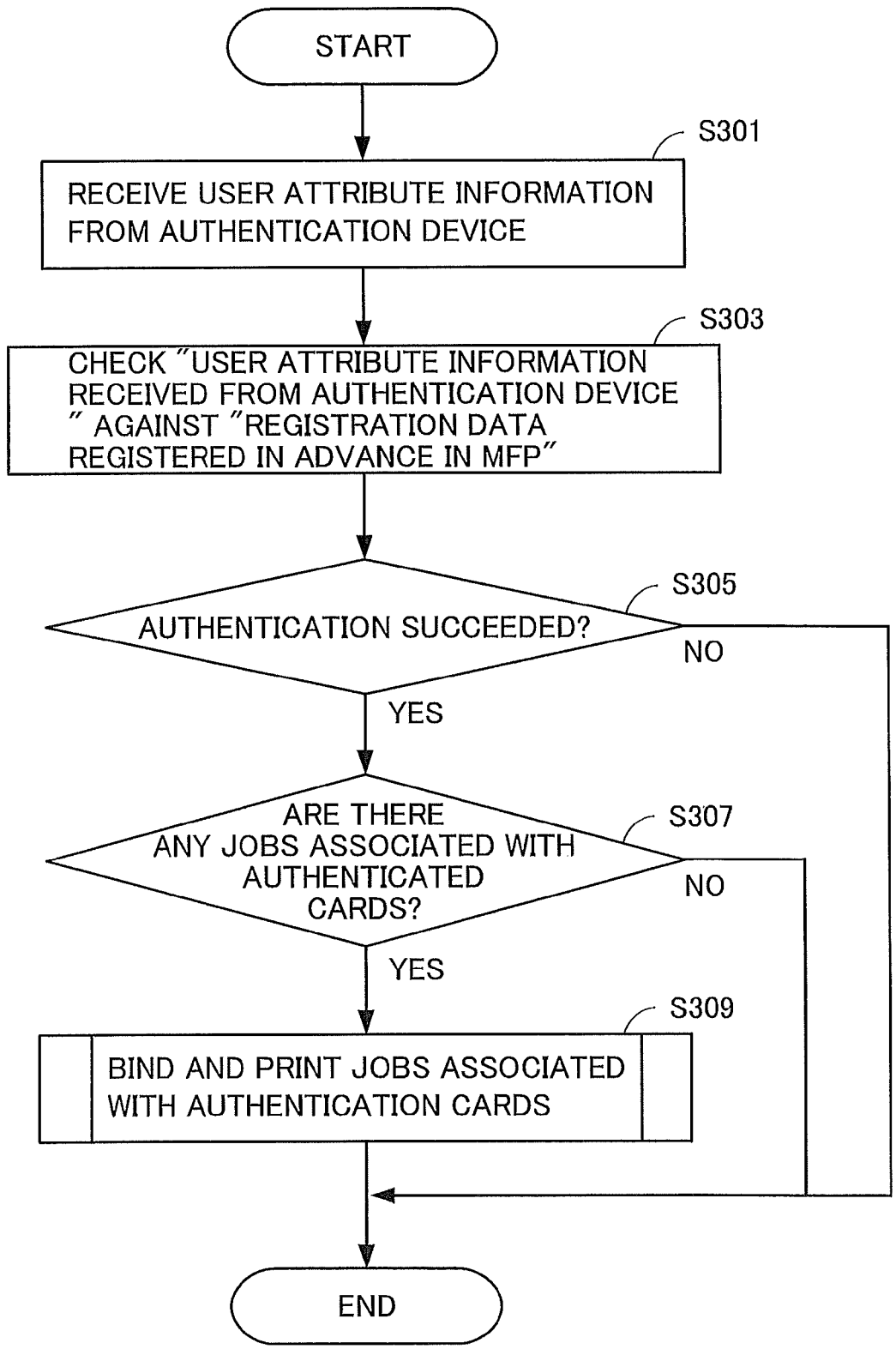
FIG. 9 is a flowchart illustrating the operations of the MFP according to the first embodiment.

FIG. 9 is a flowchart illustrating the operations of MFP 1 according to the first embodiment. CPU 27 reads a control program stored in ROM 23 or HDD 11 to perform the processing shown in the flowchart in FIG. 9 on the basis of the program. The same applies to the flowcharts and sequence diagrams described below, and thus, description thereof will not be repeated.

In step S301, CPU 27 receives the user attribute information transmitted from authentication device 50.

In step S303, CPU 27 checks the user attribute information received from authentication device 50 against the registration data registered in advance in MFP 1. For the checkup, the authentication table is referred to.

In step S305, CPU 27 determines whether the authentication has succeeded for each authentication card 90 read by authentication device 50.

If it is determined in step S305 that the authentication has succeeded, in step S307, CPU 27 determines whether there are any jobs stored in HDD 11 in association with authentication cards 90 authenticated successfully.

If it is determined in step S307 that there are such jobs, in step S309, CPU 27 performs a binding and printing process for the jobs. The binding and printing process is carried out in a manner as will be described later. If there is only one job, CPU 27 may perform a printing process for the job as in the case of performing a single print job. CPU 27 may also set a print mode for the job as in the case of performing the binding and printing process.

When the binding and printing process is finished, or if it is determined in step S305 that there is no authentication card 90 authenticated successfully, or if it is determined in step S307 that there is no job stored in association with any of the authenticated cards 90, then CPU 27 terminates the process and enters a standby mode.

Figure 10:
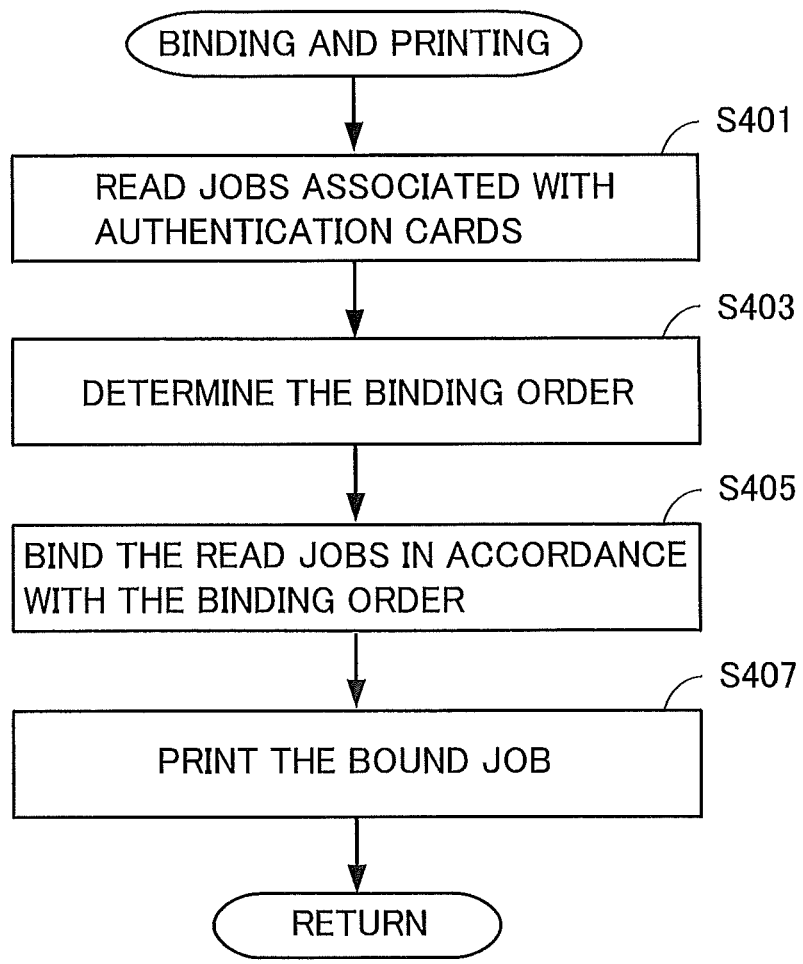
FIG. 10 is a flowchart illustrating a binding and printing process performed by the MFP.

FIG. 10 is a flowchart illustrating the binding and printing process (S309 in FIG. 9) performed by MFP 1.

CPU 27 starts the binding and printing process in step S401, where it reads from the BOXes in HDD 11 any jobs associated with the respective ones of the authenticated cards 90.

In step S403, CPU 27 determines the binding order for the read jobs. The binding order of the jobs corresponds to the order in which the jobs are to be output.

In step S405, CPU 27 combines (binds) the read jobs into one job, such that the jobs read from the BOXes are output in the determined binding order.

In step S407, CPU 27 transmits the resultant (combined) job to printing unit 17 for execution thereof. Accordingly, the combined job is printed out, whereby the binding and printing process is finished.

CPU 27 determines the binding order in the following manner.

When the first simultaneous authentication as described above is performed, CPU 27 determines the binding order in accordance with the stacked order of the plurality of authentication cards 90. The stacked order of authentication cards 90 is identified on the basis of at least one of the received radio field intensity information and the radio response time information transmitted from authentication device 50, as described above. CPU 27 determines the binding order such that a job associated with authentication card 90 of which the received radio field intensity is stronger precedes a job associated with authentication card 90 of which the received radio field intensity is weaker in the combined job. Alternatively, CPU 27 determines the binding order such that, in the combined job, a job associated with authentication card 90 of which the radio response time is shorter precedes a job associated with authentication card 90 of which the radio response time is longer. That is, CPU 27 determines the binding order such that the jobs associated with the respective authentication cards 90 are arranged in ascending order of their distance from authentication device 50. CPU 27 may determine the binding order such that a job associated with authentication card 90 of which the received radio field intensity is weaker or of which the radio response time is longer is assigned a lower ordinal number in the combined job. That is, CPU 27 may determine the binding order such that the jobs associated with the respective authentication cards 90 are arranged in descending order of their distance from authentication device 50.

In the case where the second simultaneous authentication as described above is performed, CPU 27 determines the binding order in accordance with the order in which the plurality of authentication cards 90 have been authenticated (hereinafter, referred to as the "authenticated order" of the cards). Here, the authenticated order of authentication cards 90 may be determined to be the order in which the cards have been read by authentication device 50. CPU 27 determines the binding order such that the jobs associated with the respective authentication cards 90 are arranged in the same order as the authenticated order of the cards. Alternatively, CPU 27 may determine the binding order such that the jobs associated with the respective authentication cards 90 are arranged in the inverse order from the authenticated order of the cards.

A specific example of the above-described binding function according to the present embodiment will now be described.

FIG. 11 shows, by way of example, the data stored in HDD 11.

Assume that HDD 11 stores, e.g., four jobs 101 to 104 ((A) in FIG. 11) before the binding function is performed. HDD 11 also stores, in advance, registration data for use in card authentication, in the form of an authentication table ((B) in FIG. 11). HDD 11 stores the registration data at least for authenticating four users A to D.

Jobs 101 to 104 each have job attribute information. The job attribute information includes information related to a print mode for the corresponding job. The print mode may include a color mode for output, the number of copies to be printed, single-sided or double-sided printing, to bind or not to bind ("binding"), and to staple or not to staple ("stapling"). The job attribute information further includes a user ID for the user who owns the job, the number of the BOX ("BOX number") in which the job data is stored, and others.

The job attribute information is set based on the settings included in a print instruction issued by a user. The user ID of the user who transmitted the job data, or the user who issued the print instruction, is also added into the job attribute information. That is, each job stored in HDD 11 is associated with a user ID of a user. On the other hand, authentication card 90 stores a user ID of the user who possesses the card. Therefore, the job stored in HDD 11 is associated with authentication card 90 by means of the user ID. Alternatively, the job stored in the HDD may be associated with authentication card 90 by means of the user attribute information other than the user ID, which may be a user name, for example.

Now assume that four users A to D are using MFP 1. Users A to D possess authentication cards 90A to 90D, respectively, each storing the user attribute information of the corresponding user. Job 101 has the user ID "A", and is associated with user A. Similarly, job 102, job 103, and job 104 are associated with user B, user C, and user D, respectively.

In the case where authentication cards 90A and 90B are read by authentication device 50 and the simultaneous authentication is fulfilled, the binding and printing process is carried out in the following manner. CPU 27 extracts the user ID of user A from the user attribute information read from authentication card 90A. CPU 27 determines that job 101 having that user ID is associated with authentication card 90A. Similarly, CPU 27 determines that job 102 of user B is associated with authentication card 90B. CPU 27 confirms that HDD 11 stores no jobs, other than jobs 101 and 102, in association with authentication cards 90A and 90B.

There are jobs 101 and 102 associated with authentication cards 90A and 90B. Thus, CPU 27 combines (binds) them into one job for execution. In this manner, jobs 101 and 102 are printed together. Job 101 has three pages and job 102 has five pages, so that a total of eight pages are printed out. As for jobs 103 and 104 which are not associated with authentication card 90A or 90B, neither binding nor printing is carried out.

Here, the numbers of copies predetermined for jobs 101 and 102 are two and three, respectively. Thus, the combined job may be printed out by a total of five sets of copies. Alternatively, the combined job may be printed by the number of sets of copies corresponding to the number of copies predetermined for the job associated with authentication card 90 that is located closest to authentication device 50 (i.e., at the bottom of the card stack), or authentication card 90 that is located farthest from authentication device 50 (i.e., at the top of the card stack). Still alternatively, only one set of copies may be printed out.

According to the present embodiment, when there are a plurality of jobs associated with a plurality of authentication cards 90 read by authentication device 50, CPU 27 combines the jobs into one job and executes the resultant job. Accordingly, in order to output a plurality of jobs together, the user only needs to cause authentication device 50 to read a plurality of authentication cards 90; complicated operations are unnecessary.

CPU 27 determines the order in which the plurality of jobs are to be output ("binding order") in accordance with the stacked order or the authenticated order of authentication cards 90, and combines the jobs such that they are output in the determined order. This allows the user to output a plurality of jobs together in the order as desired by the user, without the need of performing operations necessary to designate the binding order to MFP 1. This improves the usability of MFP 1.

Second Embodiment

The basic configurations of MFP 1 and authentication device 50 according to a second embodiment are similar to those of the first embodiment, and thus, description thereof will not be repeated. The configuration of authentication card 90 and the information stored therein are also similar to those of the first embodiment. In the second embodiment, in the binding and printing process, CPU 27 determines a print mode for a combined job on the basis of the job attribute information set for the respective jobs to be combined. The binding and printing process is carried out while the binding function is being executed, as in the first embodiment.

Figure 12:
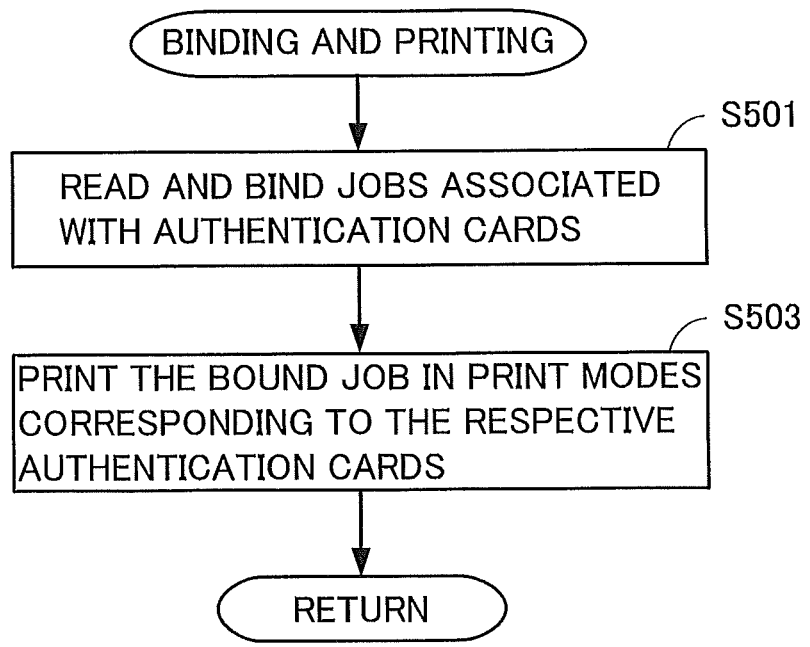
FIG. 12 is a flowchart illustrating the binding and printing process performed by the MFP according to a second embodiment.

FIG. 12 is a flowchart illustrating the binding and printing process (S309 in FIG. 9) performed by MFP 1 according to the second embodiment.

When the binding and printing process starts, in step S501, CPU 27 reads and combines (binds) the jobs associated with the authenticated cards 90.

In step S503, CPU 27 prints the combined job in accordance with the print modes corresponding to the respective authentication cards 90. The print mode which is included in the job attribute information for the job that is associated with authentication card 90 is set to be the print mode corresponding to that card 90.

The way of setting the print modes in the second embodiment will now be described in conjunction with the example shown in FIG. 11(A) in the first embodiment. For example, assume that authentication cards 90A and 90B have been authenticated simultaneously and jobs 101 and 102 are combined into one job for printing. In this case, CPU 27 prints the combined job in the print modes corresponding respectively to jobs 101 and 102.

Firstly, CPU 27 executes the combined job in the print mode associated with job 101. At this time, the printing is made in full color, on both sides of sheets of paper, and the sheets are stapled. As a result, two sets of copies, each having a total of eight pages, are output for the combined job.

Next, CPU 27 executes the combined job in the print mode associated with job 102. At this time, the printing is made in black and white, on single sides of sheets of paper, and the sheets are not stapled. As a result, three sets of copies, each having a total of eight pages, are output for the combined job.

According to the second embodiment, CPU 27 performs printing in the print modes of the jobs associated with the respective authenticated cards 90. In general, the print mode for each job is set at the time when a user issues a print instruction. This means that the combined job may be printed out as desired by each user, so that MFP 1 becomes more convenient to use. This configuration prevents an unnecessary set of copies from being output, and also prevents printing from being made in full color, which is costly, when printing in black and white will be sufficient. Accordingly, the waste of resources and cost can be avoided.

It may be configured such that each authentication card 90 stores therein information about the print mode as the user attribute information. In this case, CPU 27 may extract that information while executing the binding function and execute the combined job in accordance with the extracted print mode. Alternatively, MFP 1 may store the print mode information in association with each authentication card 90 in advance. In this case, CPU 27 may acquire, from the stored print mode information, the one corresponding to the authenticated card 90, for execution of the job. In these cases as well, the jobs can be printed out in the print mode as desired by each user. It may also be configured such that the registration information of each user includes information about a print mode. In this case, a job may be executed in a print mode that is acquired from the registration information of the user who is associated with the job.

After a plurality of sets of copies are printed out in different print modes as described above, CPU 27 may output the sets of printouts into different paper discharge trays 5, or output the sets of printouts by changing the orientations or shifting the output positions. This allows the sets of copies which have been output in the print modes corresponding to the respective authentication cards 90 to be more distinguishable from one another, so that the usability of MFP 1 further increases.

It may also be configured such that each job included in the combined job is output in the print mode set therefor. For example, in the case where jobs 101 and 102 shown in FIG. 11 are combined into one job and printed out as a set of printouts, the part corresponding to job 101 may be printed in full color and on both sides of the sheets of paper, while the part corresponding to job 102 may be printed in black and white and on single sides of the sheets of paper.

Third Embodiment

The basic configurations of MFP 1 and authentication device 50 according to a third embodiment are similar to those of the first embodiment, and thus, description thereof will not be repeated. The configuration of authentication card 90 and the information stored therein are also similar to those of the first embodiment. In the third embodiment, in the binding and printing process, CPU 27 refers to the job attribute information of the respective jobs to be combined, and prints the combined job by only a predetermined, small number of sets of copies. The binding and printing process is carried out while the binding function is being executed, as in the first embodiment.

Figure 13:
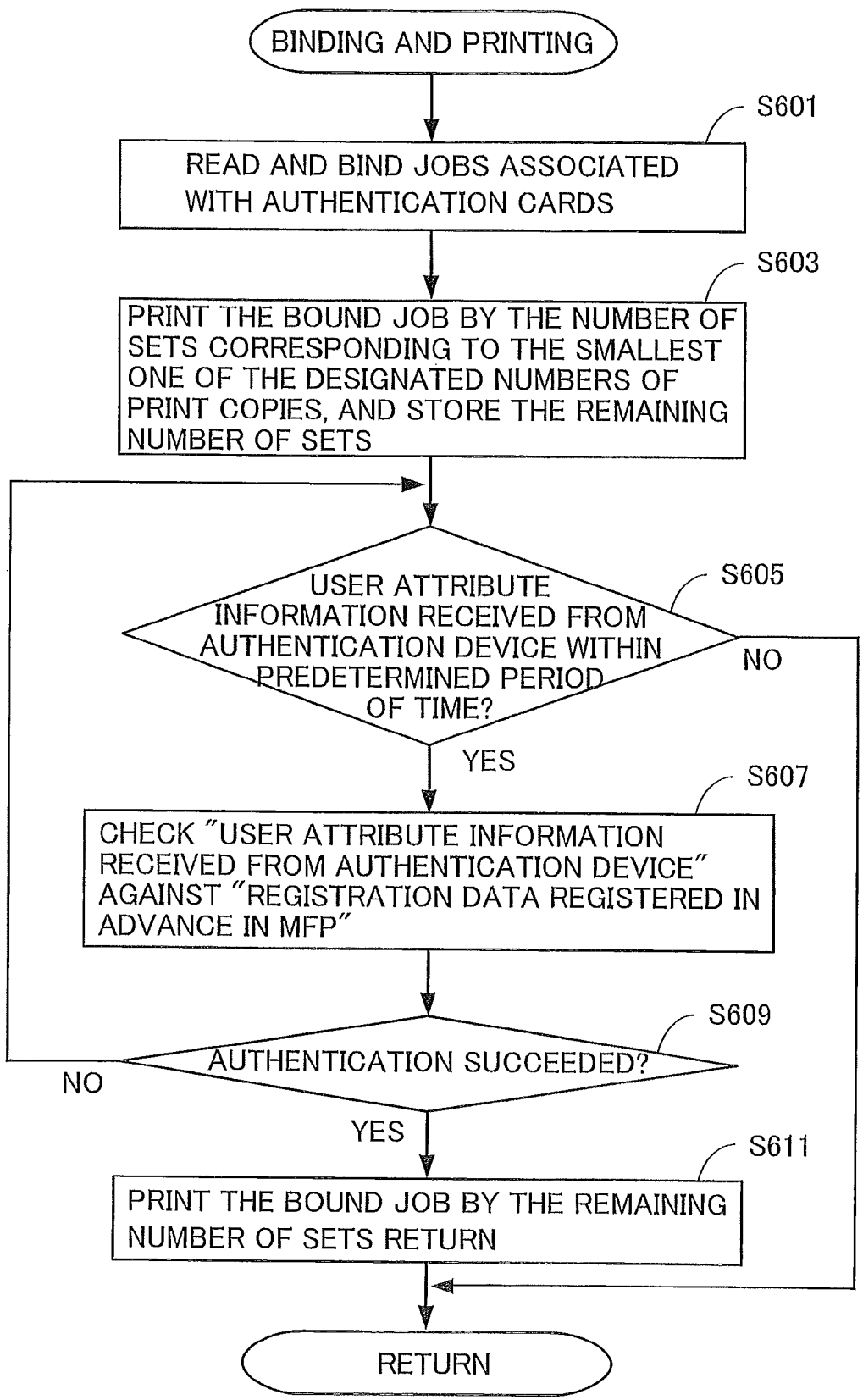
FIG. 13 is a flowchart illustrating the binding and printing process performed by the MFP according to a third embodiment.

FIG. 13 is a flowchart illustrating the binding and printing process (S309 in FIG. 9) performed by MFP 1 according to the third embodiment.

When the binding and printing process starts, in step S601, CPU 27 reads and combines (binds) the jobs associated with the authenticated cards 90.

In step S603, CPU 27 refers to the job attribute information associated with the respective authenticated cards 90, i.e., the job attribute information of the respective jobs which have been combined, to read therefrom the numbers of print copies which are designated for the respective jobs. CPU 27 then prints the combined (bound) job by the number of sets of copies corresponding to the smallest one of the read, designated numbers of print copies. For example, in the case where two jobs for which different numbers of print copies are designated have been combined into one job, CPU 27 prints the combined job by the number of sets of copies corresponding to the smaller one of the designated numbers of print copies. CPU 27 then calculates the difference between the smallest number and the greatest number among the read, designated numbers of print copies, and stores the difference. The difference indicates the number of sets of copies yet to be printed, or the remaining number of sets of copies.

In step S605, CPU 27 enters a standby mode and waits for user attribute information to be transmitted from authentication device 50. CPU 27 stays in the standby mode for a predetermined period of time (30 seconds, for example). When authentication cards 90 are brought close to authentication device 50 again by the user and are read by authentication device 50, the user attribute information read from those authentication cards 90 are transmitted to MFP 1.

If the user attribute information is received in step S605, in step S607, CPU 27 checks the received user attribute information against the registration data registered in advance in MFP 1. The checkup is performed in a similar manner as in the first embodiment described above.

In step S609, CPU 27 determines whether authentication has succeeded for the received user attribute information.

If it is determined in step S609 that the authentication has succeeded, in step S611, CPU 27 prints the combined job by the remaining number of sets of copies. This number corresponds to the difference stored in step S603. As a result, together with the sets of copies previously printed out, the combined job is printed by the number of sets of copies corresponding to the greatest number among the designated numbers of print copies read from the job attribute information of the respective jobs.

When CPU 27 has performed printing in step S611, or if CPU 27 does not receive the user attribute information within the predetermined period of time in step S605, the binding and printing process is finished. If it is determined in step S609 that the authentication has failed, the process returns to step S605.

A specific example of the binding and printing process according to the third embodiment will now be described in conjunction with the example shown in FIG. 11(A) in the first embodiment. For example, assume that authentication cards 90A and 90B have been authenticated simultaneously and jobs 101 and 102 are combined into one job for printing. At this time, the number of print copies designated for job 101 is two, while the number of print copies designated for job 102 is three.

Firstly, CPU 27 prints the combined job by the number of sets of copies corresponding to the smaller number of print copies designated for job 101. As a result, two sets of copies are printed out. CPU 27 stores one (i.e. the difference between three and two) as the remaining number of sets of copies. Thereafter, CPU 27 waits for a predetermined period of time.

If authentication cards 90A and 90B are read and simultaneously authenticated again while CPU 27 is in the standby mode, then CPU 27 prints the combined job by the remaining number of sets of copies, which is one set. As a result, a total of three sets of copies are printed out.

In the case where user A is performing printing using the binding function, the combined job has already been printed by the desired number of sets of copies (the number of print copies designated for job 101 of user A) at the initial job printing operation (in S603). Thus, user A may finish the binding and printing process by not performing reading of authentication cards 90 again (NO in S605). On the other hand, in the case where user B is performing printing using the binding function, the number of sets of copies initially printed out (in S603) is smaller than the desired number of sets of copies (the number of print copies designated for job 102 of user B). Thus, user B may perform reading of authentication cards 90A and 90B again so as to cause the remaining one set of copies to be output.

It may be configured such that CPU 27 prints the remaining number of sets of copies in the case where either one of, or a predetermined one of, authentication cards 90A and 90B is read and authenticated while CPU 27 is in the standby mode. CPU 27 may determine which one of the print modes designated for jobs 101 and 102 is to be used for printing the remaining number of sets of copies, in accordance with the stacked order of authentication cards 90A and 90B which have been read during the standby mode.

According to the present embodiment, CPU 27 firstly outputs the required minimum number of sets of copies. This reduces the number of wasteful printouts, whereby the resources and cost required for printing can be saved. In the case where the user needs a greater number of copies, the user can make simple operations to cause MFP 1 to output the remaining number of copies. This makes MFP 1 more convenient to use. Particularly, the remaining copies may be output by performing card authentication again. It is thus possible to perform the binding function while maintaining a high level of security.

In the third embodiment, if three or more authentication cards 90 are authenticated, additional printing may be performed gradually in a greater number of steps. Hereinafter, a modification of the third embodiment for performing the binding and printing process will be described.

Figure 14:
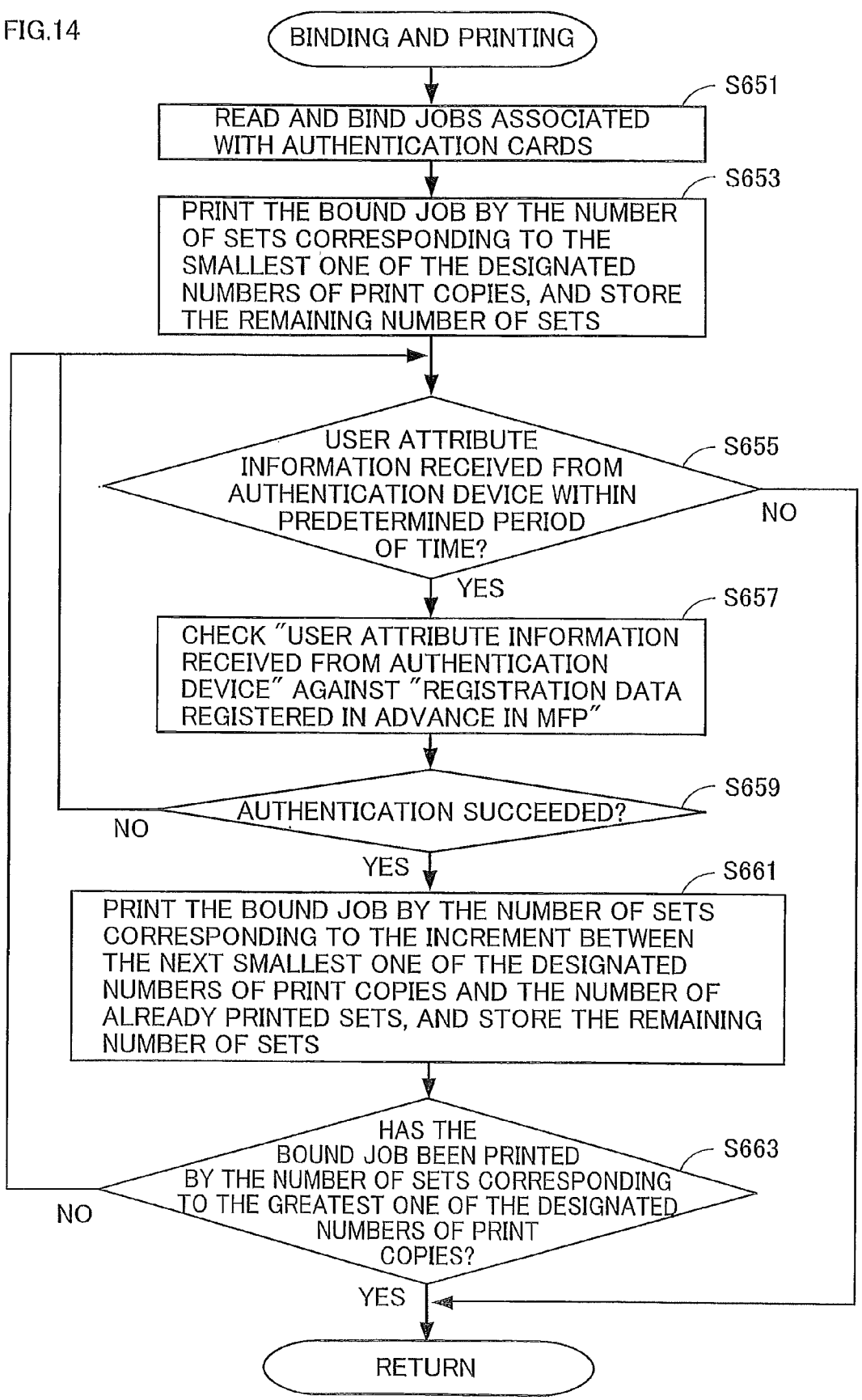
FIG. 14 is a flowchart illustrating the binding and printing process performed by the MFP according to a modification of the third embodiment.

FIG. 14 is a flowchart illustrating the binding and printing process (S309 in FIG. 9) performed by MFP 1 according to a modification of the third embodiment.

In FIG. 14, steps S651 to S659 are substantially identical to steps S601 to S609 in the flowchart shown in FIG. 13 of the third embodiment.

If authentication for the user attribute information received from authentication device 50 has succeeded in step S659, CPU 27 prints the combined job in step S661. At this time, CPU 27 extracts, from the designated numbers of print copies which are read from the job attribute information for the respective jobs included in the combined job, any one that is greater than the one for which the printing has been performed before. CPU 27 then determines the smallest one of the extracted, designated numbers of print copies. In other words, CPU 27 determines the designated number of print copies which is the second smallest, next to the one for which the printing has been finished before. For example, assume that the designated numbers of print copies of two, four, and six have been read for three jobs and two sets of copies have already been printed out. At this time, of the remaining two numbers of print copies of four and six, four is determined to be the smallest number of print copies. That is, four is determined to be the second smallest number of print copies next to two. Thereafter, CPU 27 determines the increment between the determined number of print copies and the number of already printed copies, and prints the number of sets of copies corresponding to the increment. For example, in the example described above, CPU 27 determines the increment of sets of copies between the already printed two sets of copies and the determined four sets of copies, and prints two sets of copies corresponding to the increment. CPU 27 then calculates the difference between the number of sets of copies already printed and the greatest one of the read, designated numbers of print copies, and stores the difference.

In step S663, CPU 27 determines whether the number of sets of copies already printed coincides with the greatest one of the designated numbers of print copies. That is, CPU 27 determines whether the difference calculated in step S661 is zero (0). In this manner, it is determined whether the combined job has been printed by the number of sets of copies corresponding to the greatest one of the designated numbers of print copies.

If it is determined in step S663 that the sets of copies corresponding to the greatest, designated number of print copies have not been printed yet, CPU 27 repeats the processes in steps S655 to S661.

If it is determined in step S663 that the sets of copies corresponding to the greatest one of the designated numbers of print copies have been printed out, or if it is determined in step S655 that the user attribute information has not been received within the predetermined period of time, CPU 27 finishes the binding and printing process. If it is determined in step S659 that the authentication has failed, the process returns to step S655.

A specific example of the binding and printing process performed in the above-described manner will now be described, again in conjunction with the example shown in FIG. 11(A). For example, assume that authentication cards 90A to 90C for users A to C, respectively, have been authenticated simultaneously and jobs 101 to 103 are combined into one job for printing. At this time, the numbers of print copies designated for jobs 101, 102, and 103 are two, three, and four, respectively.

For the combined job, CPU 27 firstly prints two sets of copies, in correspondence with the smallest number of print copies designated for job 101. At this time, CPU 27 stores two (i.e. the difference between four and two) as the remaining number of sets of copies. CPU 27 then enters a standby mode.

If authentication cards 90A to 90C are simultaneously authenticated again while CPU 27 is in the standby mode, CPU 27 prints the combined job again. The number of sets of copies printed this time is one, which is obtained by subtracting the number of already printed sets of copies (two) from the number of print copies designated for job 102 (three) that is the smallest number next to the number designated for job 101. While a total of three sets of copies have been printed out so far, printing of the number of sets of copies corresponding to the greatest number of print copies designated for job 103 (four) has not been finished. Thus, CPU 27 enters a standby mode again.

If authentication cards 90A to 90C are simultaneously authenticated again while CPU 27 is in the standby mode, CPU 27 further prints the combined job by the remaining number of sets of copies. The number of sets of copies printed this time is one, which is obtained by subtracting the number of already printed sets of copies (three) from the number of print copies designated for job 103 (four) that is the smallest number next to the number designated for job 102. As a result, the combined job has been printed by the number of sets of copies corresponding to the greatest number of print copies designated for job 103 (four). Therefore, CPU 27 finishes the binding and printing process.

It may be configured such that CPU 27 performs additional printing in the case where at least one of, or only predetermined one or two of, authentication cards 90A to 90C are read and authenticated while CPU 27 is in the standby mode. CPU 27 may set the print mode for the additional printing in accordance with the stacked order of, or the combination of, authentication cards 90 that have been read during the standby mode.

According to the present modification, CPU 27 firstly prints the number of sets of copies corresponding to the smallest one of the number of print copies designated for the respective jobs, and thereafter, it prints the additional sets of copies in steps, in accordance with the card authentication operations. This can avoid the waste of resources and cost required for printing, as in the above-described embodiments. It is also possible to cause MFP 1 to output the remaining number of copies, as necessary, with simple operations and while maintaining a high level of security. Particularly, even in the case where three or more authentication cards 90 have been authenticated, only the required number of copies can be output as desired by each user, whereby the above-described benefits are surely achieved.

Fourth Embodiment

The basic configurations of MFP 1 and authentication device 50 according to a fourth embodiment are similar to those of the first embodiment, and thus, description thereof will not be repeated. The configuration of authentication card 90 and the information stored therein are also similar to those of the first embodiment. In the fourth embodiment, in the binding and printing process, CPU 27 prints the combined job in two steps, as in the third embodiment. The fourth embodiment differs from the third embodiment in that the second-time printing is performed in response to a user's input operation. The binding and printing process is carried out while the binding function is being executed, as in the first embodiment.

In the present embodiment, the user's input operation is accepted via a remaining-set printing confirmation screen (hereinafter, referred to as the "confirmation screen") 200, which is displayed on operation panel 25. Firstly, confirmation screen 200 will be described.

Figure 15:
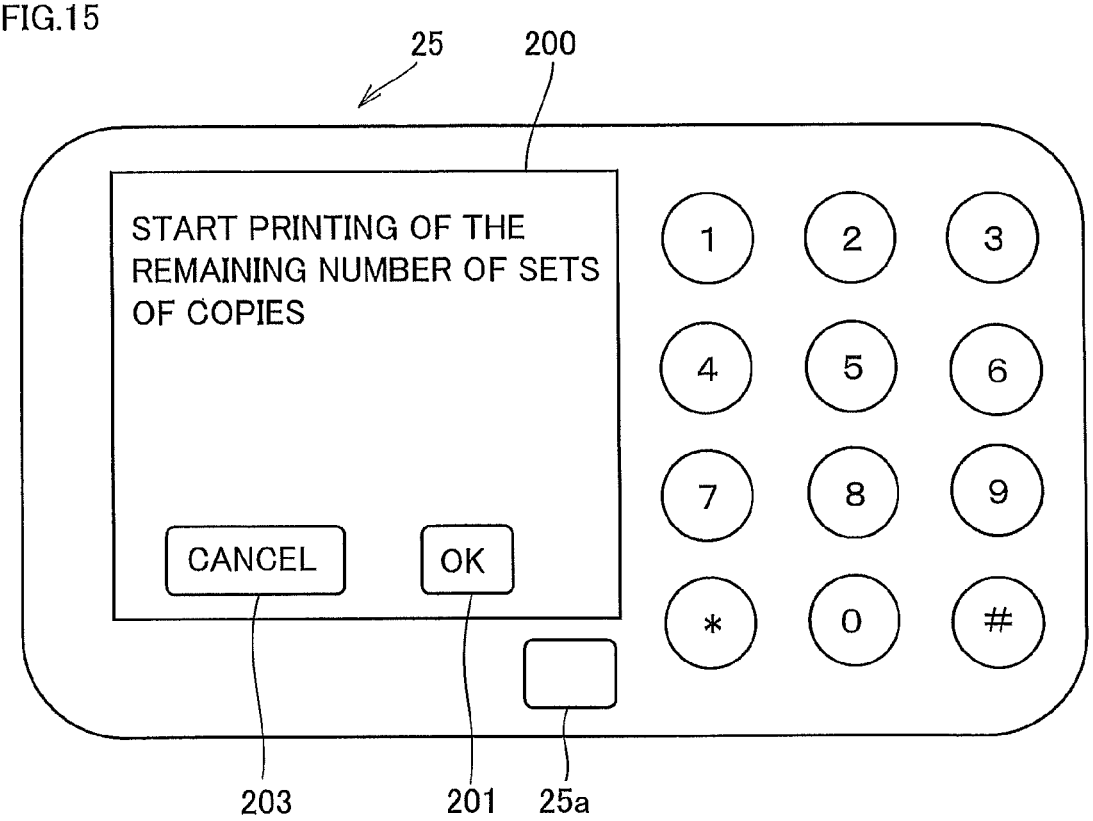
FIG. 15 shows an operation panel on which a remaining-set printing confirmation screen is displayed.

FIG. 15 shows operation panel 25 on which confirmation screen 200 is displayed.

Referring to FIG. 15, confirmation screen 200 is displayed by CPU 27 on the LCD in operation panel 25. Confirmation screen 200 includes a display which confirms the user whether to print the remaining number of sets of copies. Confirmation screen 200 also includes a button (OK button) 201 to start printing of the remaining number of sets of copies, and a cancel button 203. Remaining-set print start button 201 and cancel button 203 are each pressed down when the user touches the position on the LCD where the corresponding button is displayed.

Operation panel 25 further includes an abort button 25*a* arranged thereon. When abort button 25*a* is pressed, CPU 27 stops the function that is running on MFP 1.

Figure 16:
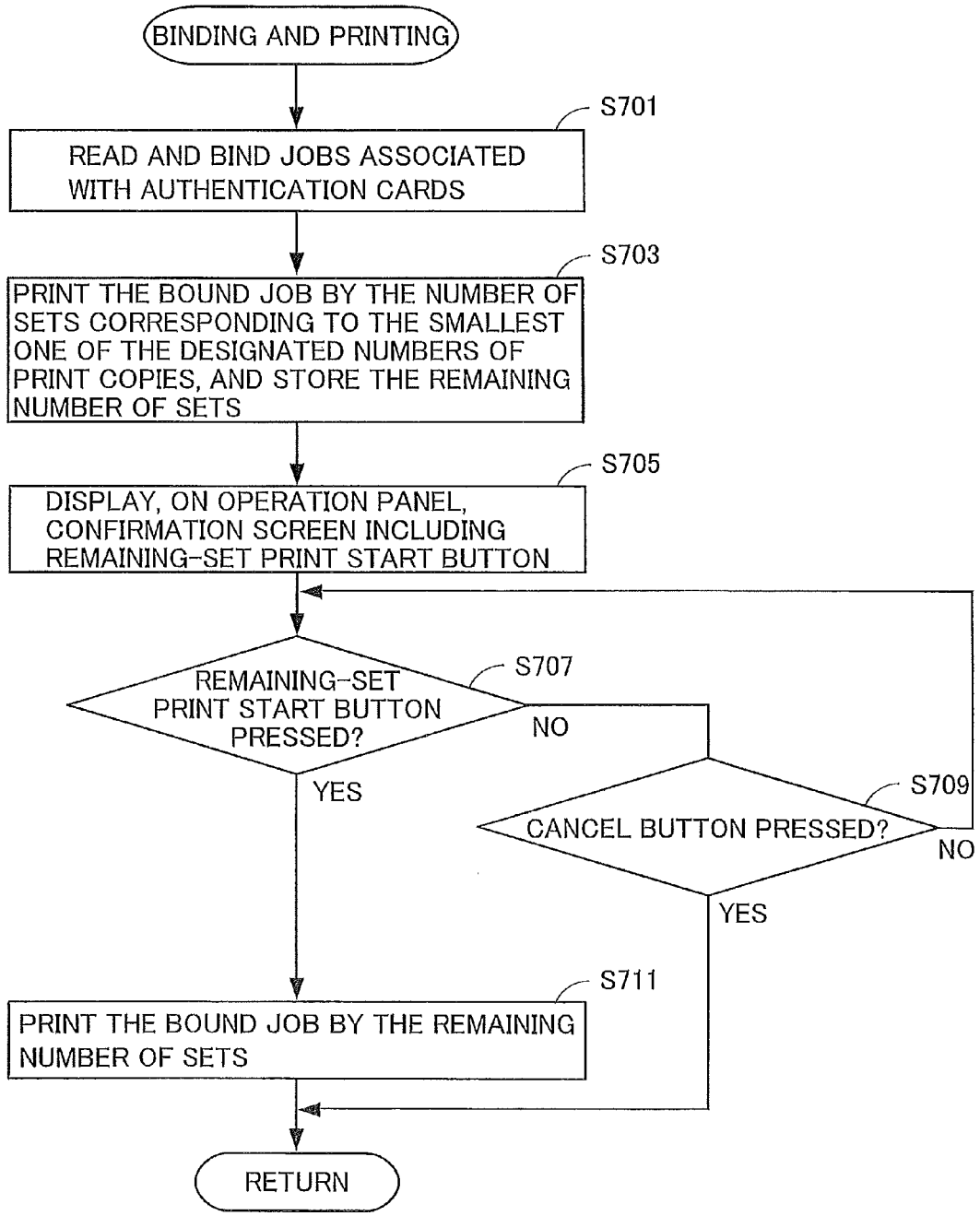
FIG. 16 is a flowchart illustrating the binding and printing process performed by the MFP according to a fourth embodiment.

FIG. 16 is a flowchart illustrating the binding and printing process (S309 in FIG. 9) performed by MFP 1 according to the fourth embodiment.

The processes in steps S701 and S703 in FIG. 16 are similar to those in steps S601 and S603 in the flowchart in FIG. 13 in the third embodiment.

In step S705, CPU 27 displays, on operation panel 25, confirmation screen 200 including remaining-set print start button 201.

In each of steps S707 and S709, CPU 27 waits for the user to input an operation on operation panel 25.

If remaining-set print start button 201 is pressed in step S707, in step S711, CPU 27 further prints the combined job by the remaining number of sets of copies.

If the additional printing is performed in step S711, or if remaining-set print start button 201 is not pressed in step S707 but cancel button 203 is pressed in step S709, CPU 27 finishes the binding and printing process, without performing further printing.

The specific example of the present embodiment is substantially identical to that described in the third embodiment, and thus, description thereof will not be repeated here. That is, while the remaining sets of copies are printed out when card authentication is performed during the time when CPU 27 is in the standby mode in the third embodiment above, in the present embodiment, the remaining sets of copies are printed out when a predetermined operation is performed on confirmation screen 200.

According to the present embodiment, as in the third embodiment, CPU 27 firstly prints the number of sets of copies corresponding to the smallest one of the designated numbers of print copies for the jobs. This avoids the waste of resources and cost required for printing. If the user needs a greater number of copies, the user may perform a certain operation via operation panel 25 to cause MFP 1 to output the remaining number of copies, as in the third embodiment. Particularly, the user may perform the operation of causing MFP 1 to output the remaining copies while confirming the display on operation panel 25. This further increases the usability of MFP 1.

The display on confirmation screen 200 is not restricted to the one described above; it may be changed as appropriate. CPU 27 may display the remaining number of sets of copies and other information more specifically on confirmation screen 200 in order to accept the user operations.

In the fourth embodiment, in the case where three or more authentication cards 90 are authenticated, additional printing may be performed gradually in a greater number of steps. Hereinafter, a modification of the fourth embodiment for performing the binding and printing process will be described.

Figure 17:
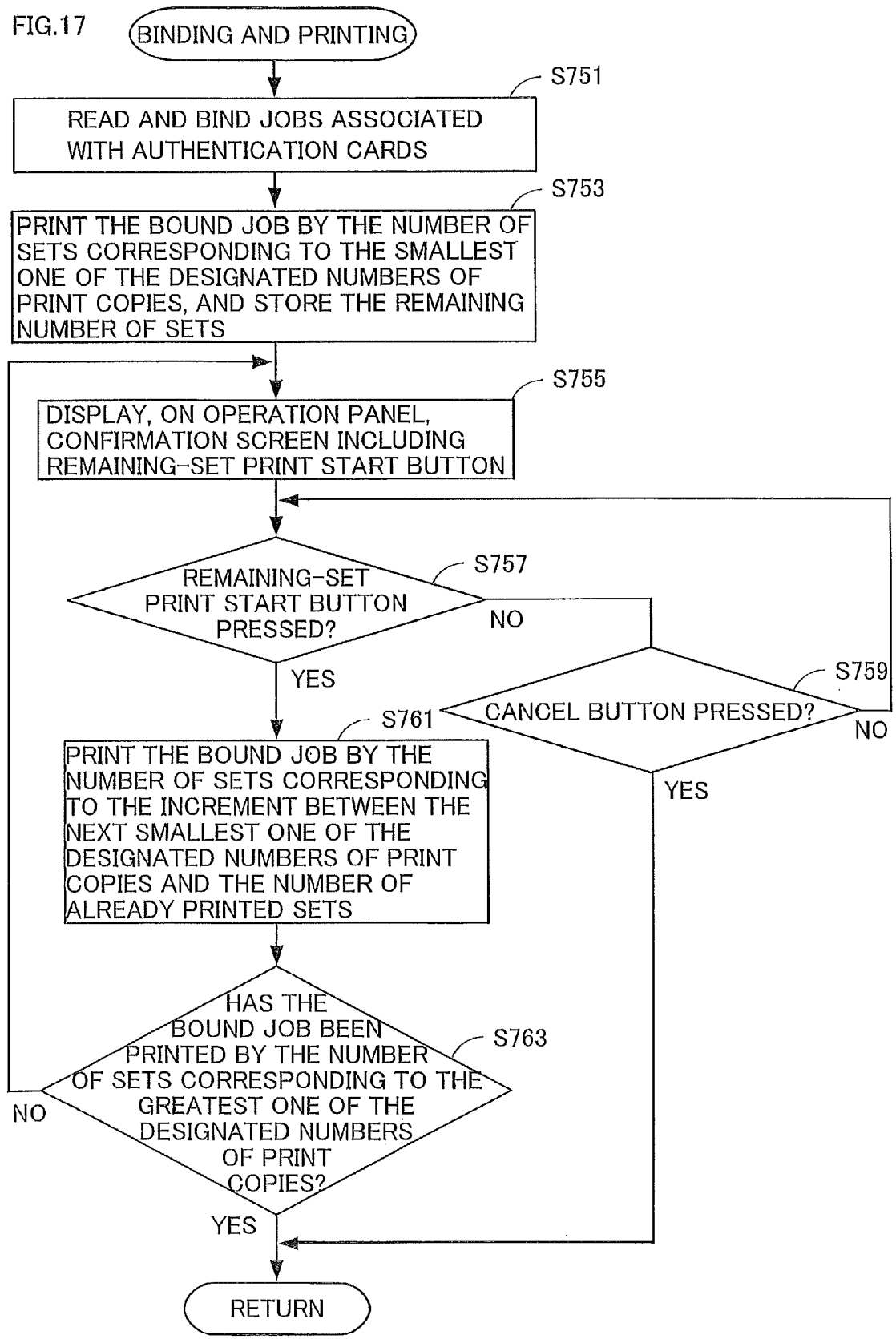
FIG. 17 is a flowchart illustrating the binding and printing process performed by the MFP according to a modification of the fourth embodiment.

FIG. 17 is a flowchart illustrating the binding and printing process (S309 in FIG. 9) performed by MFP 1 according to a modification of the fourth embodiment.

The processes in steps S751 to S759 in FIG. 17 are identical to those in steps S701 to S709 in the flowchart shown in FIG. 16 in the fourth embodiment described above. It is noted that confirmation screen 200 displayed in step S755 may specifically indicate the number of copies to be additionally printed when the user presses remaining-set print start button 201, and other information.

If remaining-set print start button 201 is pressed in step S757, CPU 27 performs printing of the combined job in step S761. At this time, CPU 27 extracts, from the designated numbers of print copies which are read from the job attribute information for the respective jobs included in the combined job, any one that is greater than the one for which the printing has been performed before. CPU 27 then determines the smallest one of the extracted, designated numbers of print copies. In other words, CPU 27 determines the designated number of print copies which is the smallest, next to the one for which the printing has been finished before. Thereafter, CPU 27 determines the increment between the determined number of print copies and the number of already printed copies, and prints by the increment. CPU 27 then calculates the difference between the number of sets of copies already printed and the greatest one of the read, designated numbers of print copies, and stores the difference.

In step S763, CPU 27 determines whether the number of sets of copies already printed coincides with the greatest number among the designated numbers of print copies. In this manner, it is determined whether the combined job has been printed by the number of sets of copies corresponding to the greatest, designated number of print copies.

If it is determined in step S763 that the sets of copies corresponding to the greatest, designated number of print copies have not been printed yet, CPU 27 repeats the processes in steps S755 to S761.

If it is determined in step S763 that the sets of copies corresponding to the greatest, designated number of print copies have been printed out, or if remaining-set print start button 201 is not pressed in step S757 but cancel button 203 is pressed in step S759, CPU 27 finishes the binding and printing process, without performing further printing.

According to the present embodiment, CPU 27 firstly prints the sets of copies corresponding to the smallest one of the designated numbers of print copies, and performs additional printing in a stepwise manner in response to the operation performed on operation panel 25. Accordingly, the waste of resources and cost required for printing can be avoided, as in the above embodiments. It is also possible to cause MFP 1 to output the remaining number of copies as desired with simple operations. Particularly, even in the case where three or more authentication cards 90 have been authenticated, only the required number of copies can be output as desired by each user, whereby the above-described benefits are surely achieved.

Fifth Embodiment

The basic configurations of MFP 1 and authentication device 50 according to a fifth embodiment are similar to those of the first embodiment, and thus, description thereof will not be repeated. The configuration of authentication card 90 and the information stored therein are also similar to those of the first embodiment. In the fifth embodiment, in the binding and printing process, CPU 27 determines the order of organizing a plurality of jobs on the basis of user attribute information stored in authentication cards 90. The binding and printing process is carried out while the binding function is being executed, as in the first embodiment.

FIG. 18 shows a print priority table which is set in MFP 1 according to the fifth embodiment.

The print priority table is set and stored in advance in HDD 11. The print priority table shows correspondence between users' job title information and print priorities. In the print priority table according to the present embodiment, there are five levels of print priority from "1" to "5" in descending order, which are assigned to the users' job titles (corporate job titles) of "director general", "director", "manager", "chief", and "clerk", respectively.

FIG. 19 shows, by way of example, job data stored in HDD 11.

Assume that HDD 11 stores a job 111 for a user A and a job 112 for a user B. For each of jobs 111 and 112, the job attribute information is set, as described above.

In the present embodiment, the user's job title information (user status) is further associated with each job 111, 112. Association of the user's job title information is performed by CPU 27 when card authentication is performed for authentication card 90 associated with that job, in the following manner. Authentication card 90 for user A stores the user attribute information indicating that the job title is "manager". Authentication card 90 for user B stores the user attribute information indicating that the job title is "chief". In this case, when user A is authenticated as a result of the card authentication, the user's job title information "manager" is associated with job 111. When user B is authenticated as a result of the card authentication, the user's job title information "chief" is associated with job 112.

Jobs 111 and 112 have different levels of print priority as follows. Referring to the print priority table shown in FIG. 18, the print priority level for job 111 is "3" which corresponds to the user's job title "manager". The print priority level for job 112 is "4" which corresponds to the user's job title "chief". This means that job 111 is given a higher print priority than job 112.

Figure 20:
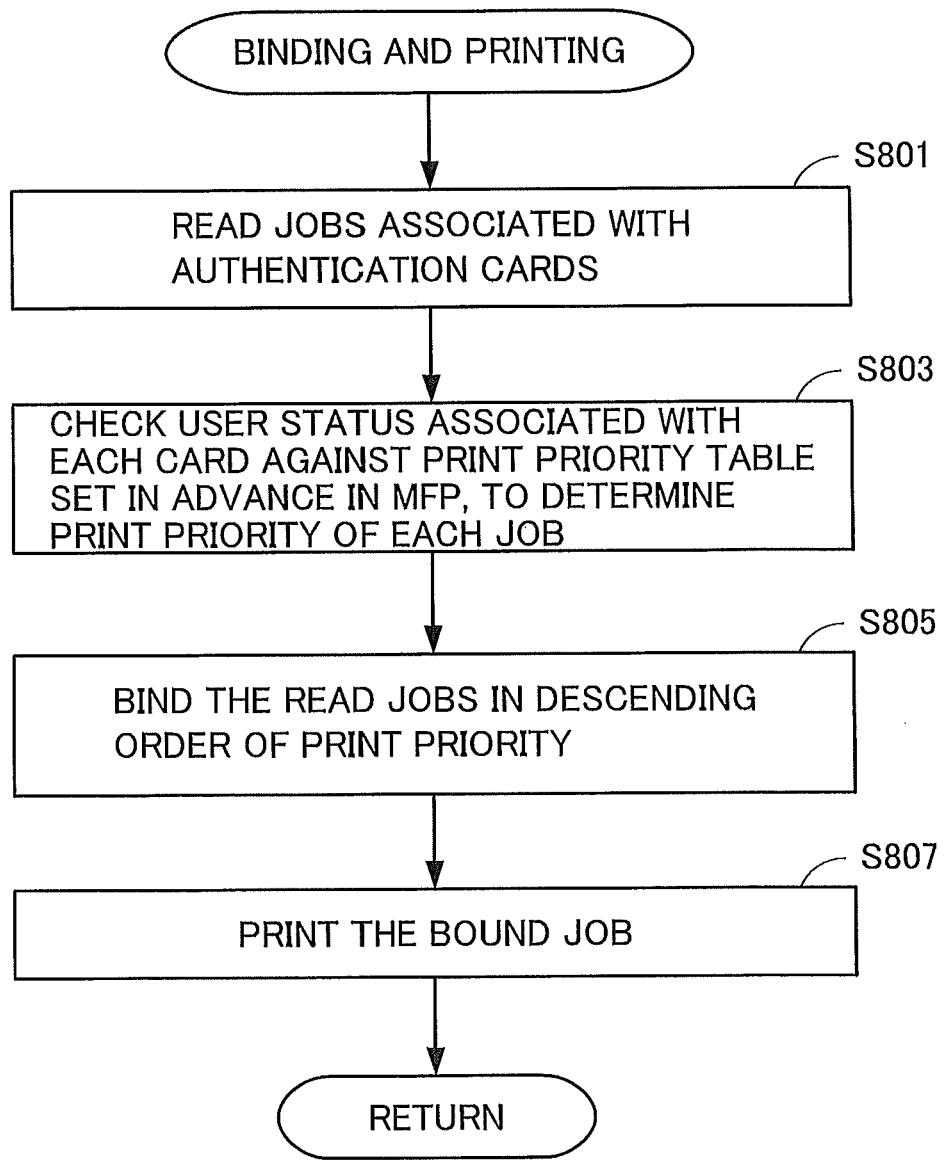
FIG. 20 is a flowchart illustrating the binding and printing process performed by the MFP according to the fifth embodiment.

FIG. 20 is a flowchart illustrating the binding and printing process (S309 in FIG. 9) performed by MFP 1 according to the fifth embodiment.

In the present embodiment, when the binding and printing process starts, in step S801, CPU 27 reads from HDD 11 any jobs associated with the respective authentication cards 90.

In step S803, CPU 27 causes the users' job title information related to the respective authentication cards 90 to be associated with the jobs related to the corresponding cards 90. CPU 27 then checks the user's job title information related to each authentication card 90 against the print priority table, to determine the print priority for each job.

In step S805, CPU 27 combines (binds) the read jobs. The jobs are bound in descending order of print priority. Accordingly, in the combined job, a job assigned a higher level of print priority, i.e., a job of the user whose rank at the office is relatively higher, precedes a job assigned a lower level of print priority.

In step S807, CPU 27 performs printing of the combined job. The binding and printing process is then finished.

According to the present embodiment, a job for the user of a higher rank at the office precedes a job for the user of a lower rank at the office in the combined job, and it appears on lower-numbered pages in a set of printouts. A user whose rank at the office is higher would likely generate a relatively important document. When jobs are combined and printed with the binding function, the pages for such a relatively important document precede the others, so that a set of printouts organized in a reasonable manner may be obtained. The user does not need to perform complicated operations for designating the order of arrangement of the jobs, which further improves the usability of MFP 1.

The print priorities of the respective jobs may be determined, not only on the basis of the users' job title information, but also on the basis of other user attribute information or job attribute information associated with the respective authentication cards 90 or the respective jobs. In such a case, a print priority table for setting print priorities in accordance with the user attribute information or the job attribute information may be set in advance. For example, the print priorities may be set in accordance with the information about the users' ages or the departments to which the users belong. It may also be configured such that jobs of which color mode is set to full color, for example, precede jobs of which color mode is set to black and white in the combined job.

The print priority information may be designated by a user as part of the settings in a print instruction, and may be included as it is in the job attribute information. In this case, the print priority information is included in each job in advance. When a plurality of authentication cards 90 are authenticated, CPU 27 may acquire print priority information for a plurality of jobs associated with the cards 90, directly from the job attribute information of those jobs. CPU 27 may then determine the order of organizing the jobs on the basis of the print priority information. In this case, it is unnecessary to set a print priority table in advance in HDD 11 or the like.

Sixth Embodiment

The basic configurations of MFP 1 and authentication device 50 according to a sixth embodiment are similar to those of the first embodiment, and thus, description thereof will not be repeated. The configuration of authentication card 90 and the information stored therein are also similar to those of the first embodiment. In the sixth embodiment, in the binding and printing process, CPU 27 determines the order of organizing a plurality of jobs on the basis of card information (card type information) stored in authentication cards 90. The binding and printing process is carried out while the binding function is being executed, as in the first embodiment.

FIG. 21 shows a print priority table which is set in MFP 1 according to the sixth embodiment.

The print priority table is set and stored in advance in HDD 11, as is the table in the fifth embodiment. The print priority table shows correspondence between the categories for authentication cards 90 and the print priorities. CPU 27 can distinguish between the categories to which the respective authenticated cards 90 belong, from the card information stored in the respective cards 90, as described above. At the time of authentication printing of a certain job, CPU 27 may determine the print priority of that job, based on the category to which the authenticated card 90 belongs, by referring to the print priority table. There are five levels of print priority of "1" to "5", as in the fifth embodiment.

In the print priority table of the present embodiment, three types of card information are prepared, which are different in the manner of classification from each other. The first card information (card information (1)) is based on so-called card classes. There are five categories of "black card (black)", "gold card (gold)", "silver card (silver)", "bronze card (bronze)", and "classic card (classic)". The categories "black", "gold", "silver", "bronze", and "classic" correspond to the print priority levels "1", "2", "3", "4", and "5", respectively. The second card information (card information (2)) is based on whether each user belongs to a company or not. There are two categories of "corporate card" and "personal card (personal)". Authentication cards 90 possessed by the users who work for the company belong to the category of "corporate card", while the other cards 90 belong to the category of "personal". The categories "corporate card" and "personal" correspond to the print priority levels "1" and "2", respectively. The third card information (card information (3)) is based on whether each user belongs to a certain department at the office. There are two categories of "department staff member's card" and "visitor card". The "department staff member's card" and the "visitor card" correspond to the print priority levels "1" and "2", respectively.

It is here assumed that in the present embodiment, the first card information (1) among the above-described three types of card information is associated with each job.

FIG. 22 shows, by way of example, job data stored in HDD 11.

Assume that a job 121 for a user A and a job 122 for a user B are stored in HDD 11. For each of jobs 121 and 122, the job attribute information is set, as in the above embodiments.

In the present embodiment, the card information (card status) is further associated with the respective jobs 121 and 122. Association of the card information with a job is performed by CPU 27 when card authentication is performed for authentication card 90 associated with that job, as described below. Authentication card 90 for user A belongs to the category of "gold card", and the card information to that effect is stored in the card. Authentication card 90 for user B belongs to the category of "classic card", and the card information to that effect is stored in the card. In this case, the card information "gold" is associated with job 121, while the card information "classic" is associated with job 122.

Jobs 121 and 122 have the following relationship in terms of print priority. Referring to the print priority table shown in FIG. 21, the print priority level of job 121 becomes "2" in correspondence with the card information "gold". The print priority level of job 122 becomes "5" in correspondence with the card information "classic". As such, job 121 is given a higher print priority than job 122.

Figure 23:
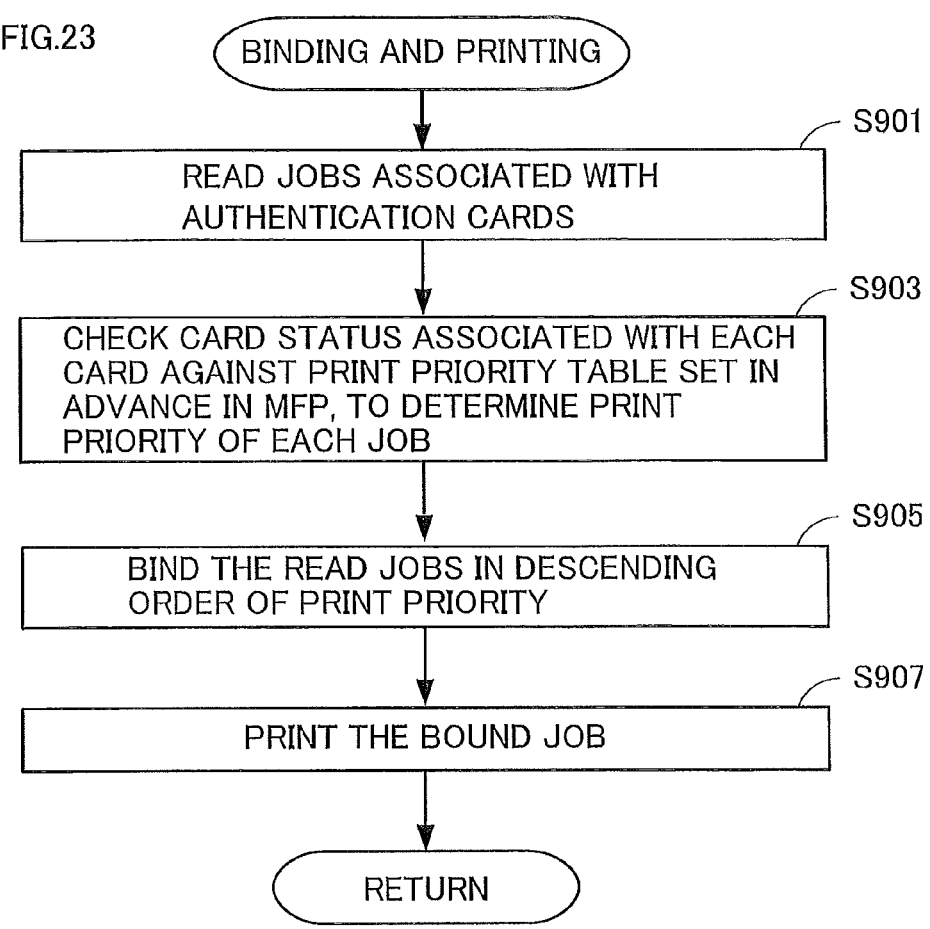
FIG. 23 is a flowchart illustrating the binding and printing process performed by the MFP according to the sixth embodiment.

FIG. 23 is a flowchart illustrating the binding and printing process (S309 in FIG. 9) performed by MFP 1 according to the sixth embodiment.

In step S901, CPU 27 reads from HDD 11 any jobs associated with the respective authentication cards 90.

In step S903, CPU 27 causes the card information associated with each authentication card 90 to be associated with the job associated with that authentication card 90. Further, CPU 27 checks the card information associated with each authentication card 90 against the print priority table, to determine the print priority of each job.

In step S905, CPU 27 combines (binds) the read jobs. In binding the jobs, the jobs are arranged in descending order of print priority. That is, the jobs are organized in accordance with the order of print priority of the corresponding cards.

In step S907, CPU 27 performs printing of the combined job. The binding and printing process is then finished.

According to the present embodiment, in the combined job, a job corresponding to authentication card 90 given a higher print priority precedes a job corresponding to authentication card 90 given a lower print priority, and it appears on lower-numbered pages in a set of printouts. Accordingly, the user does not have to perform complicated operations for designating the order of arrangement of the jobs in order to obtain a well-organized set of printouts. This further increases the usability of MFP 1.

Suppose that the print priorities are to be determined on the basis of the first card information (card information (1)). In this case, assume that authentication card 90 which belongs to a category of a higher card class and thus is given a higher priority, such as a "black card" or a "gold card", is pre-assigned to a user who often uses the card. In the case where authentication card 90 may be used as a credit card, authentication card 90 of a higher priority is assigned to a user who can settle the greater amount of money. In the binding process, jobs of the user who possesses authentication card 90 of such a higher priority are printed in preference to jobs of the other users. This ensures satisfaction of the users.

In the present embodiment, not restricted to the first card information, the second card information (card information (2)) may be used to determine the print priorities. For example, a user who possesses authentication card 90 that is the "corporate card" may receive preferential treatment because the user works for the company. In this sense, the user is given a higher priority than the others. In this case, the print priorities may be determined on the basis of the second card information, and in the binding process, jobs of the user who possesses the "corporate card" of a higher priority may be printed in preference to jobs of the other users. This also ensures satisfaction of the users.

The third card information (card information (3)) may also be used for determination of the print priorities. For example, assume that a user who possesses authentication card 90 that is the "department staff member's card" is allowed to use the MFP 1 installed in that department in preference to others. The user is given a higher priority than the others in this sense. In this case, the print priorities may be determined on the basis of the third card information, and in the binding process, jobs of the user who is given a higher priority may be printed in preference to jobs of the other users. This again ensures satisfaction of the users.

The print priority table is not restricted to the one related to the three types of card information as described above. The print priority table may indicate correspondence of one or two types of card information, or four or more types of card information, with print priorities.

The card information may include the print priority information itself. In this case, CPU 27 may acquire the print priority information stored in authentication cards 90 for which card authentication has been performed, to determine the order of organizing the corresponding jobs on the basis of the print priority information. A print priority table does not have to be set in advance in HDD 11.

Seventh Embodiment

The basic configurations of MFP 1 and authentication device 50 according to a seventh embodiment are similar to those of the first embodiment, and thus, description thereof will not be repeated. The configuration of authentication card 90 and the information stored therein are also similar to those of the first embodiment. In the seventh embodiment, in the binding and printing process, CPU 27 determines the way of printing (i.e., a print mode for) a combined job, on the basis of the stacked order of the authentication cards. In the present embodiment, the binding and printing process is carried out when the first simultaneous authentication described above has been performed and while the binding function is being executed.

Figure 24:
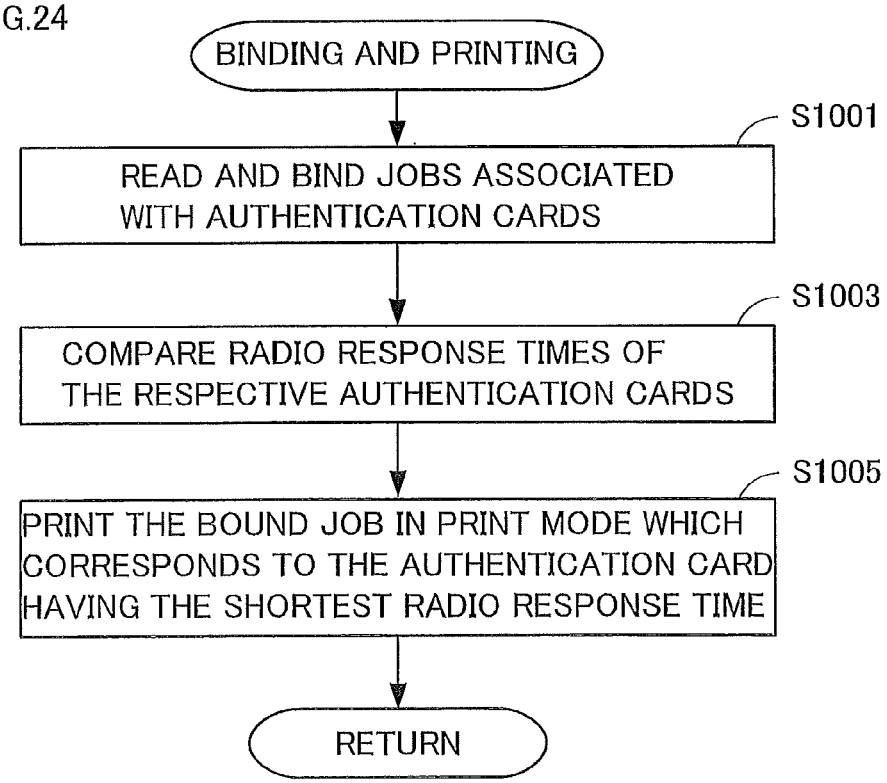
FIG. 24 is a flowchart illustrating the binding and printing process performed by the MFP according to a seventh embodiment.

FIG. 24 is a flowchart illustrating the binding and printing process (S309 in FIG. 9) performed by MFP 1 according to the seventh embodiment.

In step S1001, CPU 27 reads any jobs associated with the authenticated cards 90, and combines (binds) the read jobs. The binding order of the jobs may be set as appropriate on the basis of the authenticated order of authentication cards 90, or on the basis of the order of print priorities set for authentication cards 90, as in the above-described embodiments.

In step S1003, CPU 27 determines the stacked order of the plurality of authenticated cards 90. The stacked order is determined in the manner as described above. That is, CPU 27 determines the stacked order of authentication cards 90 on the basis of the radio response time of each authentication card 90. More specifically, CPU 27 determines the stacked order of the cards on the basis of the radio response time information received from authentication device 50.

In step S1005, CPU 27 reads a print mode from the job attribute information for the job corresponding to authentication card 90 that has the shortest radio response time, i.e., authentication card 90 that is closest to authentication device 50 (or at the bottom of the card stack). CPU 27 then executes the combined job in that print mode, to output a set of printouts. When the printing is completed, the binding and printing process is finished.

In the present embodiment, for example assume that simultaneous authentication (first simultaneous authentication) of two authentication cards 90A and 90B is performed as shown in FIG. 5 in the state where jobs 101 to 104 as shown in FIG. 11 are stored in HDD 11. In this case, the binding and printing process is performed in the following manner. CPU 27 combines jobs 101 and 102 corresponding to the authenticated cards 90A and 90B, respectively. At this time, authentication card 90B is closer to authentication device 50 (i.e., card 90B is stacked beneath card 90A), and thus, CPU 27 adopts the print mode designated for job 102. Accordingly, CPU 27 outputs three sets of eight-page printouts, which are printed in black and white, on single sides of sheets of paper, and not stapled, in accordance with the print mode set for job 102.

According to the present embodiment, CPU 27 determines the way of printing a combined job on the basis of the stacked order of authentication cards 90. This means that when the user performs card authentication for a plurality of authentication cards 90, the user may arrange the cards in such a manner that authentication card 90 that is associated with the job whose print mode the user wishes to adopt comes closest to authentication device 50 (or, located at the bottom of the card stack). Accordingly, the user can determine the way of printing a combined job with a simple and intuitive operation. The user does not have to perform complicated operations for selecting and setting the printing manner, so that MFP 1 becomes more convenient to use.

Alternatively, CPU 27 may determine a print mode by determining the stacked order of authentication cards 90 on the basis of the intensities of received radio waves. Still alternatively, when the second simultaneous authentication described above has been performed, CPU 27 may determine the authenticated order of authentication cards 90 and select, as a print mode for a combined job, the print mode set for the job associated with authentication card 90 that was authenticated in the first place.

In the case where the first simultaneous authentication has been performed, CPU 27 may print a combined job in the print mode associated with authentication card 90 that is farthest from authentication device 50 (or, located at the top of the card stack). During the operation of performing the binding function in accordance with the first simultaneous authentication, some user may feel more intuitive or natural when the combined job is output in the print mode corresponding to authentication card 90 that is farthest from authentication device 50 and closest to the user (or, located at the top of the card stack). The following modification will be effective in such a case.

Figure 25:
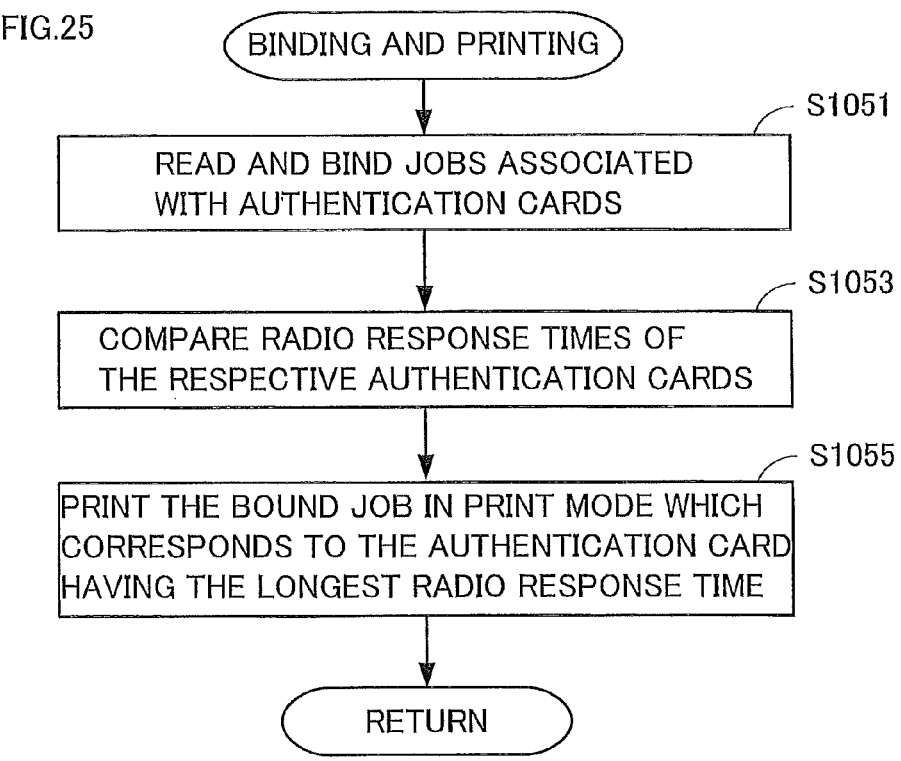
FIG. 25 is a flowchart illustrating the binding and printing process performed by the MFP according to a modification of the seventh embodiment.

FIG. 25 is a flowchart illustrating the binding and printing process (S309 in FIG. 9) performed by MFP 1 according to such a modification of the seventh embodiment.

In FIG. 25, steps S1051 and S1053 are identical to steps S1001 and S1003 in the flowchart shown in FIG. 24. That is, CPU 27 reads and binds any jobs associated with authentication cards 90 that have been authenticated simultaneously (S1051). CPU 27 then determines the radio response time for each authentication card 90 (S1053).

In step S1055, CPU 27 reads a print mode from the job attribute information for the job corresponding to the authentication card that has the longest radio response time. CPU 27 executes the combined job in that print mode, to output a set of printouts. When the printing is completed, the binding and printing process is finished.

In the binding and printing process, in the case where the print mode set for the job associated with authentication card 90 that is farthest from authentication device 50 (or stacked at the top) is adopted as well, the user can output the printed copies in a desired printing manner, with a simple and intuitive operation, as in the above-described case.

In the case where the second simultaneous authentication has been performed, CPU 27 may determine the authenticated order of authentication cards 90 and select, as a print mode for a combined job, the print mode set for the job corresponding to authentication card 90 that was authenticated lastly.

Eighth Embodiment

The basic configurations of MFP 1 and authentication device 50 according to an eighth embodiment are similar to those of the first embodiment, and thus, description thereof will not be repeated. The configuration of authentication card 90 and the information stored therein are also similar to those of the first embodiment. In the eighth embodiment, in the binding and printing process, CPU 27 executes a combined job in the print mode corresponding to the authentication card selected by a user. In the present embodiment, the binding and printing process is carried out when the first simultaneous authentication described above has been performed and while the binding function is being executed.

Figure 26:
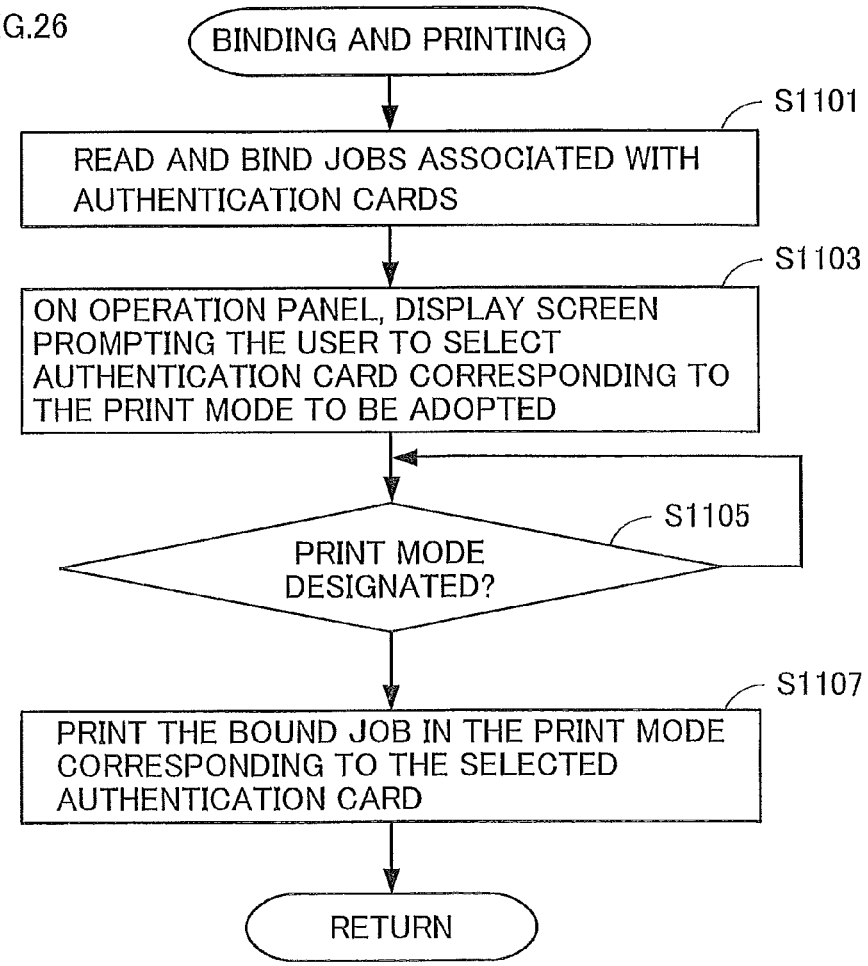
FIG. 26 is a flowchart illustrating the binding and printing process performed by the MFP according to an eighth embodiment.

FIG. 26 is a flowchart illustrating the binding and printing process (S309 in FIG. 9) performed by MFP 1 according to the eighth embodiment.

In step S1101, CPU 27 reads and combines (binds) any jobs associated with the authenticated cards.

In step S1103, CPU 27 displays a print mode selection screen 210 on operation panel 25. Print mode selection screen 210 is a screen for prompting the user to select one of authentication cards 90 which corresponds to the print mode the user wishes to adopt. In the state where print mode selection screen 210 is being displayed, the user operates operation panel 25 to designate a print mode for the combined job. Print mode selection screen 210 will be described later in detail.

In step S1105, CPU 27 waits for the user to designate authentication card 90 corresponding to the print mode which is to be adopted for printing of the combined job.

If the print mode is designated in step S1105, in step S1107, CPU 27 prints the combined job in the print mode that is set for a job associated with the selected authentication card, i.e., in the print mode corresponding to the selected authentication card. When the printing is completed, the binding and printing process is finished.

Figure 27:
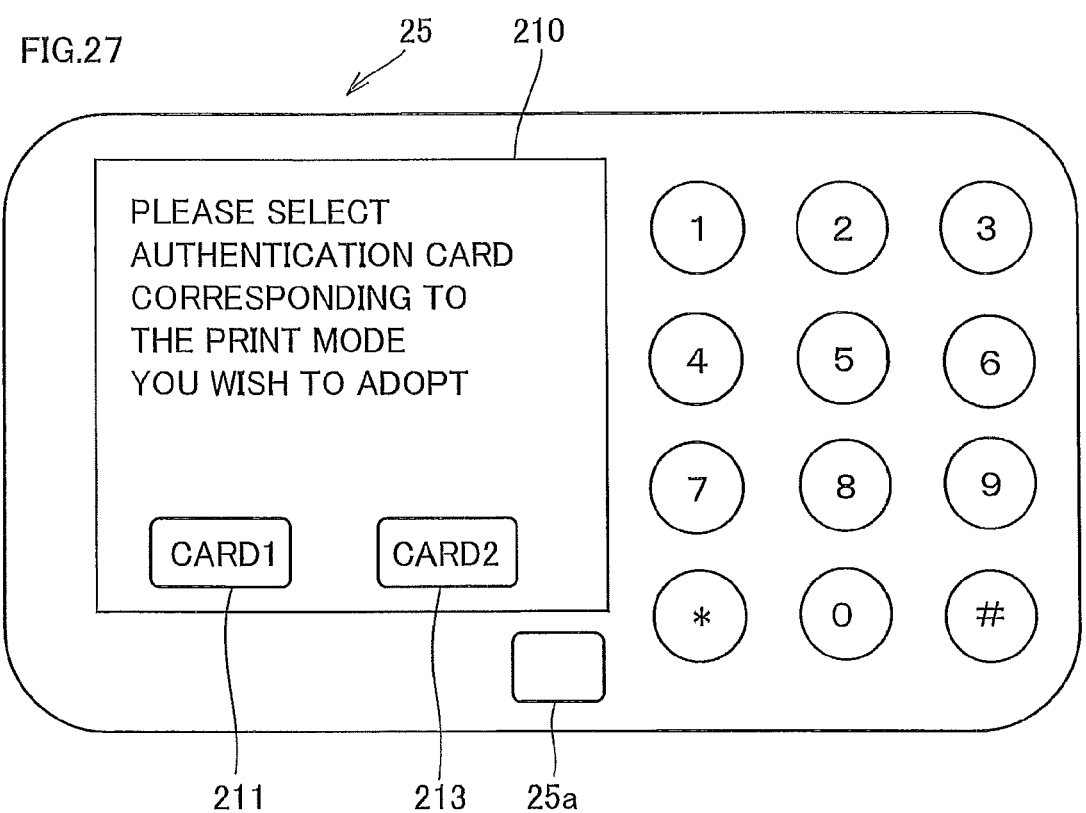
FIG. 27 shows an operation panel on which a print mode selection screen is displayed.

FIG. 27 shows operation panel 25 on which print mode selection screen 210 is displayed.

Referring to FIG. 27, print mode selection screen 210 is displayed on the LCD in operation panel 25. In print mode selection screen 210, character information prompting the user to select authentication card 90 corresponding to the print mode to be adopted is displayed. At the lower part of print mode selection screen 210, selection buttons 211 and 213 are displayed which are used to select one of the authenticated cards 90 corresponding to the print mode to be adopted. When either one of selection buttons 211 and 213 is pressed by the user, CPU 27 adopts the print mode that is set for the job associated with authentication card 90 corresponding to the pressed button 211 or 213.

While two selection buttons 211 and 213 are shown in the figure, three or more selection buttons may be displayed in accordance with the number of the authenticated cards 90. The selection button does not necessarily have to be displayed for each one of the authenticated cards 90. For example, the selection buttons may be displayed for a predetermined number of authentication cards 90 which have been authenticated earlier than the others (i.e., the predetermined number of cards 90 from the bottom of the card stack), or the selection buttons may be displayed only for authentication cards 90 corresponding to higher print priorities. For each of selection buttons 211 and 213, the detailed information regarding the print mode to be adopted when the button is selected may be displayed in addition to the name of authentication card 90 corresponding to the button.

According to the present embodiment, in the binding process, CPU 27 displays print mode selection screen 210 on operation panel 25 to prompt the user to select the print mode to be adopted. This allows the user to cause MFP 1 to output the combined job in a desired print mode. The user can readily and reliably select the print mode while seeing print mode selection screen 210.

CPU 27 may cooperate with a printer driver running on external PC 71 or the like to provide a predetermined display on the monitor of PC 71 or the like, so as to prompt the user to select a print mode. In this case as well, the user can cause MFP 1 to output the combined job in a desired print mode.

Ninth Embodiment

The basic configurations of MFP 1 and authentication device 50 according to a ninth embodiment are similar to those of the first embodiment, and thus, description thereof will not be repeated. The configuration of authentication card 90 and the information stored therein are also similar to those of the first embodiment. In the ninth embodiment, in the binding and printing process, CPU 27 combines only the jobs for which binding has been designated, and executes the combined job. In the present embodiment, the binding and printing process is carried out in the case where the above-described first simultaneous authentication has been performed and while the binding function is being executed.

FIG. 28 shows, by way of example, job data stored in HDD 11.

In the present embodiment, HDD 11 stores four jobs 131 to 134. The job attribute information of each of jobs 131 to 134 includes bind setting (the "binding" field in FIG. 28). The bind setting indicates, when a plurality of authentication cards 90 have been authenticated simultaneously, whether a job is to be bound (combined) ("yes") or not to be bound ("no") with the other jobs. If a job is set to be bound ("yes"), CPU 27 binds the job with the others. If a job is set not to be bound ("no"), CPU 27 does not bind the job with the others. The bind setting is designated for each job when the user issues a print instruction. Even in the case where the bind setting indicates "no", the job is printed out at the time of authentication printing in accordance with card authentication of single authentication card 90. In FIG. 28, two jobs 131 and 134 are set to be bound ("yes"), while the other two jobs 132 and 133 are set not to be bound ("no").

Figure 29:
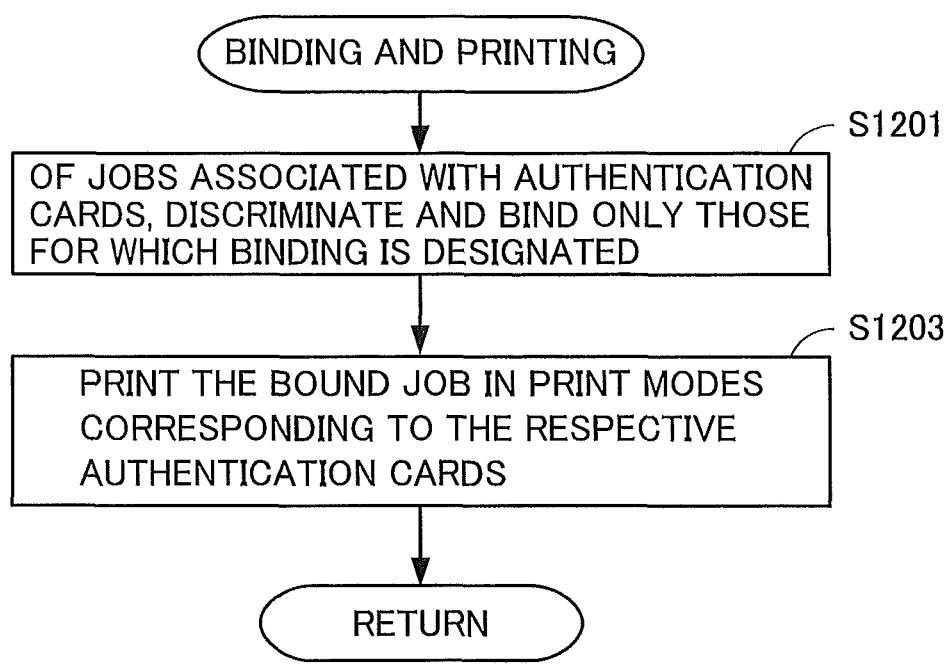
FIG. 29 is a flowchart illustrating the binding and printing process performed by the MFP according to a ninth embodiment.

FIG. 29 is a flowchart illustrating the binding and printing process (S309 in FIG. 9) performed by MFP 1 according to the ninth embodiment.

In step S1201, of the jobs associated with the authenticated cards 90, CPU 27 discriminates and reads those for which the bind setting is set to "yes". CPU 27 then combines (binds) the read jobs. In this manner, only the jobs which are set to be bound ("yes") are combined, while those which are set not to be bound ("no") are not combined.

In step S1203, CPU 27 prints the combined job in the print modes corresponding to the respective authentication cards 90. The printing is carried out in a similar manner as in the second embodiment. When the printing of the combined job is completed, the binding and printing process is finished.

In the present embodiment, assume that the bind settings for jobs 131 to 134 are as shown in FIG. 28. At this time, when two authentication cards 90A and 90B corresponding to users A and B, respectively, are authenticated simultaneously, CPU 27 performs the binding and printing process in the following manner.

Of jobs 131 and 133 associated with authentication card 90A, CPU 27 reads job 131 which is set to be bound ("yes"). Of jobs 132 and 134 associated with authentication card 90B, CPU 27 reads job 134 which is set to be bound ("yes"). CPU 27 then combines the read jobs 131 and 134 into one job, and performs printing. At this time, CPU 27 firstly prints the combined job in the print mode corresponding to job 131, to output two sets of copies. Next, CPU 27 prints the combined job in the print mode corresponding to job 134, to output three sets of copies. CPU 27 does not execute jobs 132 and 133 which are set not to be bound ("no").

According to the ninth embodiment, CPU 27 combines only the jobs which are designated to be bound. This allows the user to cause MFP 1 to combine and output only the jobs the user wishes to combine. The jobs the user does not wish to combine are maintained in the separate state. As such, the jobs that do not have to be combined may be stored in MFP 1 without concerning the influence to the binding function. This further increases the usability of MFP 1.

The print mode for the combined job may be selected and adopted in a similar manner as in any of the other embodiments described above.

Tenth Embodiment

The basic configurations of MFP 1 and authentication device 50 according to a tenth embodiment are similar to those of the first embodiment, and thus, description thereof will not be repeated. The configuration of authentication card 90 and the information stored therein are also similar to those of the first embodiment. In the tenth embodiment, CPU 27 performs the binding and printing process by determining the print priority of each job in accordance with the presence/absence of, and the contents of, settings in the card information and the user attribute information. In the present embodiment, the binding and printing process is carried out in the case where the above-described first simultaneous authentication has been performed and while the binding function is being executed. HDD 11 stores a print priority table related to user job title information, which is the same as that in the fifth embodiment (FIG. 18), and a print priority table related to card information, which is the same as that in the sixth embodiment (FIG. 21).

FIG. 30 shows, by way of example, job data stored in HDD 11.

In the present embodiment, HDD 11 stores two jobs 141 and 142. The card information for job 141 is "gold", while the card information for job 142 is "classic". Thus, the print priority levels of jobs 141 and 142 based on the card information are "2" and "5", respectively, with reference to the print priority table shown in FIG. 21. On the other hand, the user job title information for job 141 is "manager", while the user job title information for job 142 is "director general". Thus, the print priority levels of jobs 141 and 142 based on the user job title information are "3" and "1", respectively, with reference to the print priority table shown in FIG. 18.

In the binding process, in the case where the user job title information and the card information are both stored in authentication cards 90 corresponding to the jobs to be bound, CPU 27 determines the print priorities of the respective jobs by using the user job title information in preference to the card information. That is, if jobs 141 and 142 are to be bound, CPU 27 combines the jobs, in accordance with the print priorities based on the user job title information, such that job 142 is assigned a lower ordinal number than job 141 in the order of printing.

FIG. 31 is a flowchart illustrating the binding and printing process (S309 in FIG. 9) performed by MFP 1 according to the tenth embodiment.

In step S1301, CPU 27 reads any jobs associated with authentication cards 90 which have been authenticated simultaneously.

In step S1303, CPU 27 determines whether the information read from authentication cards 90 includes the user job title information (corporate job title information) corresponding to the respective jobs.

If it is determined in step S1303 that the user job title information is included, in step S1305, CPU 27 refers to the print priority table shown in FIG. 18 on the basis of the user job title information corresponding to the respective authentication cards 90. CPU 27 determines the print priorities of the jobs associated with the respective authentication cards 90.

If it is determined in step S1303 that the user job title information is not included, in step S1307, CPU 27 determines whether the information read from authentication cards 90 includes the card information corresponding to the respective jobs.

If it is determined in step S1307 that the card information is included, in step S1309, CPU 27 refers to the print priority table shown in FIG. 21 on the basis of the card information corresponding to the respective authentication cards 90, to thereby determine the print priorities of the jobs associated with the respective authentication cards 90.

If it is determined in step S1307 that the card information is not included, in step S1311, CPU 27 identifies the stacked order of authentication cards 90, to thereby determine the print priorities in accordance with the stacked order. The stacked order may be identified in a similar manner as in the first embodiment described above. In the case where the above-described second simultaneous authentication has been performed, CPU 27 determines the print priorities in accordance with the authenticated order of authentication cards 90.

In step S1313, CPU 27 combines (binds) the read jobs in accordance with the determined print priorities.

In step S1315, CPU 27 prints the bound job. When the bound job is printed out, the binding and printing process is finished.

According to the present embodiment, CPU 27 determines the order of priorities in binding jobs in accordance with the user job title information in preference to the card information. Accordingly, the jobs can be organized in such a manner that a job corresponding to the user of a relatively higher job rank, which job would likely be more important, is assigned a lower ordinal number in the order of printing. In the case where the order of organizing the jobs cannot be determined on the basis of the user job title information, the binding order may be determined on the basis of the card information. This increases the possibility that the jobs are organized in an appropriate order. Even in the case where the binding order of the jobs cannot be determined in accordance with the user job title information or the card information, the jobs may be organized in the order as desired by the user, on the basis of the stacked order or the authenticated order of authentication cards 90.

Effects of the Embodiments

In the MFP configured as described above, when a plurality of authentication cards are read and authenticated simultaneously, a plurality of jobs associated with the authentication cards are combined for execution. This allows the user to readily print out a plurality of jobs collectively, without the need of complicated operations for designating binding of the jobs. Furthermore, jobs associated with the authenticated cards are combined, so that it is possible to output the combined job while maintaining a high level of security.

The CPU may determine the job binding order and/or the print mode in accordance with the stacked order or the authenticated order of the authentication cards, or in accordance with the operations input by a user through a display on the operation panel. In this case, the user can readily cause the MFP to output the combined job in a manner as desired by the user, whereby the usability of the MFP further increases.

[Others]

The processes in the first through tenth embodiments described above may be combined as appropriate to implement the binding function. In such a case as well, the MFP can readily bind and output a plurality of jobs, while maintaining a high level of security. For example, the jobs may be organized in descending order of print priority, as in the first embodiment, and the combined job may be printed in two steps in accordance with an operation input by a user, as in the fourth embodiment.

The user authentication is not restricted to the one performed by causing an authentication device to read an authentication card. For example, the authentication card may be replaced with any of various kinds of authentication media including a mobile terminal such as a mobile phone possessed by a user. In this case, a print priority table may be set, in accordance with attributes of the authentication medium, to associate the attributes with the print priorities. Accordingly, the print priorities may be determined for respective jobs, and thus, the binding function may be implemented in the above-described manner.

The authentication table, the print priority table, and the jobs may be stored, e.g., in an external server that the MFP is accessible through a network.

The authentication device may be built in the MFP.

The image output device may be any of black-and-white or color copier, printer, facsimile machine, or a composite machine (MFP) having those functions. The image output device is not restricted to the one which forms an image by electrophotography, but may be one which forms an image by inkjet printing, for example.

The image output device may be a scanner which reads an image of a document and stores it in a HDD or the like. In the scanner, the image data is read at the same time as user authentication. The image data is registered as a job associated with the authentication card. In the scanner, if simultaneous authentication is performed with a plurality of authentication cards, a plurality of jobs associated with those authentication cards may be combined and sent to a predetermined destination. The present invention is also applicable to a server which transmits jobs to the outside. The server stores data in association with user information. When simultaneous authentication of users is performed, the data associated with the users are combined and output (for example, sent) to a predetermined destination.

The processes in the above-described embodiments may be performed by software, or by using hardware circuits.

A program for executing the processes in the above-described embodiments may be provided, which program may be recorded on a recording medium so as to be provided to a user. The recording medium may be any of a CD-ROM, a flexible disk, a hard disk, a ROM, a RAM, or a memory card. The program may also be downloaded to the device via a communication line such as the Internet.

According to the present invention, when a plurality of authentication media are read, the image output device combines jobs associated with the authentication media for execution. Accordingly, the image output device which can output a plurality of jobs collectively, without the need of complicated operations, while maintaining a high level of security is provided. The method for controlling the image output device, and the program for controlling the image output device are also provided.

It should be understood that the embodiments described above are illustrative and non-restrictive in every respect. The scope of the present invention is defined by the terms of the claims, rather than the description above, and is intended to include any modifications within the scope and meaning equivalent to the terms of the claims.

What is claimed is:

1. An image output device for executing jobs stored in a storage medium, when a plurality of authentication media are read by an authentication device, on the basis of a result of the authentication, the image output device comprising:
   a processing unit configured to retrieve, from among the jobs stored in said storage medium, a plurality of jobs associated with the plurality of authentication media read by said authentication device, and combine said plurality of jobs into a smaller number of jobs;
   an image output unit configured to output images by executing the job combined by said processing unit;
   said plurality of authentication media are a plurality of authentication cards; and
   said processing unit identifies the stacked order of said plurality of authentication cards, determines, on the basis of the identified stacked order, the order in which said plurality of jobs are to be output by said image output unit, and combines said plurality of jobs such that the jobs are output in the determined order.

2. The image output device according to claim 1, wherein said processing unit combines said jobs when the plurality of authentication media are read by said authentication device simultaneously or within a predetermined period of time.

3. The image output device according to claim 1, further comprising a receiving unit configured to receive jobs from another apparatus, wherein
   said storage medium stores said received jobs.

4. The image output device according to claim 1, further comprising an output mode acquiring unit configured to acquire an output mode associated with each of said plurality of authentication media or each of said plurality of jobs, the output mode being used by said image output unit, wherein
   said image output unit outputs images of said combined job using one of said acquired output modes.

5. The image output device according to claim 4, wherein said output mode includes the number of print copies, and said image output unit outputs the images of said combined job by a number of sets of copies corresponding to a smallest number among a number of print copies which are associated with respective jobs combined by said processing unit.

6. The image output device according to claim 5, wherein after the images are output by the number of sets of copies corresponding to the smallest number of print copies, when an instruction is received from a user, the images are output additionally on the basis of the number of print copies associated with one of said plurality of authentication media read by said authentication device.

7. The image output device according to claim 4, wherein said image output unit identifies the order in which said plurality of authentication media have been authenticated, and determines, on the basis of the identified authenticated order, the output mode for use in outputting said combined job.

8. The image output device according to claim 4, wherein said image output unit outputs the images using one of said acquired output modes selected by a user.

9. The image output device according to claim 1, further comprising an information acquiring unit configured to acquire information associated with each of said plurality of jobs, the information indicating whether the corresponding job is to be bound or not, wherein
   said processing unit combines any of the jobs that includes the information indicating that the job is to be bound.

10. An image output device for executing jobs stored in a storage medium, when a plurality of authentication media are read by an authentication device, on the basis of a result of the authentication, the image output device comprising:
   a processing unit configured to retrieve, from among the jobs stored in said storage medium, a plurality of jobs associated with the plurality of authentication media read by said authentication device, and combine said plurality of jobs into a smaller number of jobs; and
   an image output unit configured to output images by executing the job combined by said processing unit;
   an output mode acquiring unit configured to acquire an output mode associated with each of said plurality of authentication media or each of said plurality of jobs, the output mode being used by said image output unit;
   wherein said output mode includes the number of print copies;
   wherein said image output unit outputs images of said combined job using one of said acquired output modes and outputs the images of said combined job by a number of sets of copies corresponding to a smallest number among a number of print copies which are associated with respective jobs combined by said processing unit; and
   wherein after the images are output by the number of sets of copies corresponding to the smallest number of print copies, when at least one of said plurality of authentication media is read by said authentication device, the images are output additionally on the basis of the number of print copies associated with said read authentication media.

11. An image output device for executing jobs stored in a storage medium, when a plurality of authentication media are read by an authentication device, on the basis of a result of the authentication, the image output device comprising:
   a processing unit configured to retrieve, from among the jobs stored in said storage medium, a plurality of jobs associated with the plurality of authentication media read by said authentication device, and combine said plurality of jobs into a smaller number of jobs;
   an image output unit configured to output images by executing the job combined by said processing unit;
   an output mode acquiring unit configured to acquire an output mode associated with each of said plurality of authentication media or each of said plurality of jobs, the output mode being used by said image output unit;
   wherein said plurality of authentication media are a plurality of authentication cards, and wherein said image output unit identifies a stacked order of said plurality of authentication cards, determines, on the basis of the identified stacked order, the output mode for use in outputting said combined job, and outputs images of said combined job using one of said acquired output modes.

12. A method for controlling an image output device, the image output device executing jobs stored in a storage medium, when a plurality of authentication media are read by an authentication device, on the basis of a result of the authentication, the method comprising the steps of:

retrieving, from among the jobs stored in said storage medium, a plurality of jobs associated with the plurality of authentication media read by said authentication device;

combining said plurality of jobs into a smaller number of jobs;

outputting images by executing the jobs combined in said combining step;

wherein said plurality of authentication media are a plurality of authentication cards, and wherein said combining step includes the steps of identifying the stacked order of said plurality of authentication cards, determining, on the basis of the identified stacked order, the order in which said plurality of jobs are to be output in said outputting step, and combining said plurality of jobs such that the jobs are output in the determined order.

13. The method for controlling an image output device according to claim 12, wherein said combining step includes the steps of identifying the order in which said plurality of authentication media have been authenticated, determining, on the basis of the identified authenticated order, the order in which said plurality of jobs are to be output in said outputting step, and combining said plurality of jobs such that the jobs are output in the determined order.

14. A method for controlling an image output device, the image output device executing jobs stored in a storage medium, when a plurality of authentication media are read by an authentication device, on the basis of a result of the authentication, the method comprising the steps of:

retrieving, from among the jobs stored in said storage medium, a plurality of jobs associated with the plurality of authentication media read by said authentication device;

combining the plurality of jobs into a smaller number of jobs;

outputting images by executing the job combined by said combining step;

acquiring an output mode associated with each of said plurality of authentication media or each of said plurality of jobs, the output mode being used by said outputting images step;

wherein said output mode includes the number of print copies;

wherein said outputting step outputs images of said combined job using one of said acquired output modes and outputs the images of said combined job by a number of sets of copies corresponding to a smallest number among a number of print copies which are associated with respective jobs combined by the combining step; and wherein after the images are output by the number of sets of copies corresponding to the smallest number of print copies, when at least one of said plurality of authentication media is read by said authentication device, the images are output additionally on the basis of the number of print copies associated with said read authentication media.

15. A method for controlling an image output device, the image output device executing jobs stored in a storage medium, when a plurality of authentication media are read by an authentication device, on the basis of a result of the authentication, the method comprising the steps of:

retrieving, from among the jobs stored in said storage medium, a plurality of jobs associated with the plurality of authentication media read by said authentication device;

combining said plurality of jobs into a smaller number of jobs;

outputting images by executing the job combined by said combining step;

acquiring an output mode associated with each of said plurality of authentication media or each of said plurality of jobs, the output mode being used by said outputting image step;

wherein said plurality of authentication media are a plurality of authentication cards; and wherein said outputting step identifies a stacked order of said plurality of authentication cards, and determines, on the basis of the identified stack order, the output mode for use in outputting said combined job, wherein said image output unit identifies a stacked order of said plurality of authentication cards, determines, on the basis of the identified stacked order, the output mode for use in outputting said combined job, and outputs images of said combined job using one of said acquired output modes.

16. A program for controlling an image output device, the image output device executing jobs stored in a storage medium, when a plurality of authentication media are read by an authentication device, on the basis of a result of the authentication, the program being stored in a non-transitory computer readable medium and causing a computer to execute processing comprising the steps of:

retrieving, from among the jobs stored in said storage medium, a plurality of jobs associated with the plurality of authentication media read by said authentication device;

combining said plurality of jobs into a smaller number of jobs;

outputting images by executing the job combined by the combining step;

said plurality of authentication media being a plurality of authentication cards; and identifying the stacked order of said plurality of authentication cards;

determining, on the basis of the identified stack order, the order in which said plurality of jobs are to be outputted by said image outputting step, and combining said plurality of jobs so that the jobs are output in the determined order.

17. A program for controlling an image output device, the image output device executing jobs stored in a storage medium, when a plurality of authentication media are read by an authentication device, on the basis of a result of the authentication, the program being stored in a non-transitory computer readable medium and causing a computer to execute processing comprising the steps of:

retrieving, from among the jobs stored in said storage medium, a plurality of jobs associated with the plurality of authentication media read by said authentication device;

combining said plurality of jobs into a smaller number of jobs;

outputting images by executing the job combined by the combining step;

acquiring an output mode associated with each of said plurality of authentication media or each of said plurality of jobs, the output mode being used by said outputting step;

wherein said output mode includes the number of print copies;

wherein said outputting step outputs images of said combined job using one of said acquired output modes and outputs the images of said combined job by a number of sets of copies corresponding to a smallest number among a number of print copies which are associated with respective jobs combined by said combining step; and wherein after the images are outputted by the number of sets of copies corresponding to the smallest number of print copies, when at least one of said plurality of authentication media is read by said authentication device, the images are output additionally on the basis of the number of print copies associated with said read authentication media.

18. A program for controlling an image output device, the image output device executing jobs stored in a storage medium, when a plurality of authentication media are read by an authentication device, on the basis of a result of the authentication, the program being stored in a non-transitory computer readable medium and causing a computer to execute processing comprising the steps of:

retrieving, from among the jobs stored in said storage medium, a plurality of jobs associated with the plurality of authentication media read by said authentication device;

combining said plurality of jobs into a smaller number of jobs;

outputting images by executing the job combined by said processing unit;

acquiring an output mode associated with each of said plurality of authentication media or each of said plurality of jobs, the output mode being used by said outputting step;

wherein said plurality of authentication media are a plurality of authentication cards; and wherein said outputting step identifies a stacked order of said plurality of authentication cards, determines, on the basis of the identified stack order, the output mode for use in outputting said combined job, and outputs images of said combined job using one of said acquired output modes.

* * * * *